(12) United States Patent
Chuang

(10) Patent No.: US 9,888,766 B2
(45) Date of Patent: Feb. 13, 2018

(54) LIFTING MECHANISM WITH SUPPORT FUNCTION

(71) Applicant: KELLY INTERNATIONAL CORP., Taipei (TW)

(72) Inventor: Min-Lon Chuang, Taipei (TW)

(73) Assignee: KELLY INTERNATIONAL CORP., Taipei (TW)

( * ) Notice: Subject to any disclaimer, the term of this patent is extended or adjusted under 35 U.S.C. 154(b) by 0 days.

(21) Appl. No.: 15/284,120

(22) Filed: Oct. 3, 2016

(65) Prior Publication Data

US 2017/0020280 A1    Jan. 26, 2017

Related U.S. Application Data

(63) Continuation-in-part of application No. 14/717,252, filed on May 20, 2015, now abandoned.

(30) Foreign Application Priority Data

Sep. 23, 2014 (TW) .............................. 103216824 U

(51) Int. Cl.
| | |
|---|---|
| *A47B 9/16* | (2006.01) |
| *F16M 11/24* | (2006.01) |
| *F16M 13/02* | (2006.01) |
| *F16M 11/20* | (2006.01) |
| *F16M 11/08* | (2006.01) |

(52) U.S. Cl.
CPC .............. *A47B 9/16* (2013.01); *F16M 11/08* (2013.01); *F16M 11/2014* (2013.01); *F16M 11/2092* (2013.01); *F16M 11/24* (2013.01);

*F16M 13/022* (2013.01); *F16M 2200/044* (2013.01); *F16M 2200/063* (2013.01)

(58) Field of Classification Search
CPC .............. F16M 11/08; F16M 11/2014; F16M 11/2092; F16M 11/24; F16M 2200/044; F16M 2200/063; F16M 13/022; A47B 9/16

See application file for complete search history.

(56) References Cited

U.S. PATENT DOCUMENTS

| | | | | |
|---|---|---|---|---|
| 6,592,090 B1 * | 7/2003 | Li | ....................... | F16M 11/2092 248/284.1 |
| 6,695,274 B1 * | 2/2004 | Chiu | ....................... | F16M 11/10 248/284.1 |
| 8,065,966 B1 * | 11/2011 | Bacon | ...................... | A47B 9/16 108/145 |

(Continued)

Primary Examiner — Hanh V Tran
(74) Attorney, Agent, or Firm — Rabin & Berdo, P.C.

(57) ABSTRACT

A lifting mechanism with support function includes pivot arm component composed of a first pivot arm and a second pivot arm parallel to each other. The first and second pivot arms each have two ends thereof pivotally connected to a fixation joint and an active joint respectively, and the pivotally connected points connecting the first link, the second link, the fixation joint and the active joint jointly define a parallelogram. One end of an adjustable damper pivotally connects to the pivot arm component, and the other end thereof pivotally connects to the fixation joint or the active joint via an adjustment component, so the adjustable damper can be controlled to extend/retract or be locked; the adjustment component includes a first pivot seat capable of relatively moving to change the support angle of the adjustable damper to adjust the damping support force provided from the adjustable damper.

9 Claims, 26 Drawing Sheets

(56) References Cited

U.S. PATENT DOCUMENTS

| | | | | |
|---|---|---|---|---|
| 9,504,316 B1* | 11/2016 | Streicher | ................ | A47B 21/02 |
| 2007/0040084 A1* | 2/2007 | Sturman | .............. | F16M 11/105 |
| | | | | 248/280.11 |
| 2007/0089648 A1* | 4/2007 | Harrison | .................. | A47B 9/16 |
| | | | | 108/115 |
| 2007/0259554 A1* | 11/2007 | Lindblad | ................ | F16M 11/10 |
| | | | | 439/354 |
| 2010/0127144 A1* | 5/2010 | Lange | ................ | F16M 11/2014 |
| | | | | 248/284.1 |
| 2011/0303805 A1* | 12/2011 | Lau | ...................... | F16M 11/126 |
| | | | | 248/125.8 |
| 2012/0006767 A1* | 1/2012 | Bennett | .................. | A47B 81/00 |
| | | | | 211/26 |
| 2012/0032062 A1* | 2/2012 | Newville | ............... | F16M 11/08 |
| | | | | 248/575 |
| 2013/0034347 A1* | 2/2013 | Randy | ................. | F16M 11/2085 |
| | | | | 396/428 |
| 2013/0140424 A1* | 6/2013 | Frick | ...................... | F16M 11/00 |
| | | | | 248/550 |
| 2014/0291457 A1* | 10/2014 | Rotheisler | .......... | F16M 11/2085 |
| | | | | 248/123.2 |
| 2014/0361134 A1* | 12/2014 | Chuang | .............. | F16M 11/2014 |
| | | | | 248/276.1 |
| 2015/0265048 A1* | 9/2015 | Lindblad | ............... | A47B 81/062 |
| | | | | 248/123.11 |
| 2015/0289641 A1* | 10/2015 | Ergun | ...................... | A47B 9/16 |
| | | | | 108/42 |
| 2016/0018054 A1* | 1/2016 | Simon | ................... | F16M 11/10 |
| | | | | 248/222.11 |
| 2016/0109056 A1* | 4/2016 | Chen | ....................... | B25H 1/12 |
| | | | | 248/277.1 |
| 2016/0305600 A1* | 10/2016 | Bowman | ............... | F16M 11/10 |

\* cited by examiner

LIFTING MECHANISM WITH SUPPORT FUNCTION

CROSS-REFERENCE TO RELATED APPLICATION

This is a continuation-in-part of U.S. application Ser. No. 14/717,252, filed on May 20, 2015, which is incorporated herewith by reference.

BACKGROUND OF THE INVENTION

1. Technical Field

The present invention relates to a lifting mechanism with support function, in particular to a lifting mechanism which can be controlled to vertically extend/retract and revolve, and can be controlled to adjust its support.

2. Description of Related Art

An office chair with a gas cylinder is an example for devices that have a simple lifting mechanism that allows easy altitudinal adjustment. In a conventional office chair, a seat is connected to a caster-equipped base through a pneumatic device. The pneumatic device is operated by a switch to place the seat at different altitudes that meets various needs in use. However, such a structure can only realize altitudinal adjustment, and does not support displacement in other directions (such as forward/backward or leftward/right displacement), making its use limited.

There is also a mechanism having a post (or a plurality of links) connected to a loading platform (for receiving a keyboard and a monitor) through at least one pneumatic element (such as a gas cylinder). It is such designed that the support force forms the pneumatic element is slightly greater than the overall weight of the loading platform (plus the keyboard and the monitor), so that after the loading platform (plus the keyboard and the monitor) is adjusted to a desired position, it is held at that position and a balanced posture of the whole mechanism is formed. While this structure allows altitudinal and positional adjustment depending on the characteristics of the used post (or the plural links), the balance between the loading platform and the pneumatic element tends to be broken by external force (such as that from a user's palms pressing loading platform when operating a keyboard placed on the) in practical use. When the user operates the mechanism, the loading platform gradually descends; for the reason, the user should use his arm and hand to lift the loading platform, which will result in potential mental pressure; besides, the user may suffer from tendonitis if using the mechanism for a long time, which making it inconvenient to use.

In view of the shortcomings of the known lifting devices, the inventor of the present invention has made improvements thereto and creates the present invention.

SUMMARY OF THE INVENTION

The present invention is to use a pivot arm component to provide a linkage supporting between a preset loading component and a loading platform set, and a damping positioning mechanism is located between the linkage and the loading component, so that the damping positioning mechanism that can be controlled to extend or retract, and can automatically position the linked structure after operation, the loading platform set can be well positioned at its post-adjustment position.

The present invention is to make the damping positioning mechanism and the pivot arm component arranged between different loading components and loading platform sets as needed, so as to improve the application of the device and add value to the final products using the same.

The present invention can form a parallelogram by the linkage of the pivot arm component, the fixation joint of the loading component and the active joint of the loading platform set, so that the loading platform set can be freely moved upward/downward, forward/backward, or rightward/leftward in a certain angular area, while remaining horizontal, thereby providing convenient use.

The active joint and the fixation joint of the present invention can further work with a revolver so that the loading platform set is allowed to perform rotation in both directions in addition to relative movements, thereby improving its convenience in use.

Besides, the present invention is further to provide an adjustment component to the front end of the adjustment damper, so that the front end of the adjustment damper can be located at the first pivot seat; the support angle of the adjustment damper can be changed by adjusting the position of the first pivot seat so as to further change the adjustment damper's damping support forse provided for the loading platform set; in this way, the user can adjust the adjustment damper to the proper angle according to the loading weight so as to achieve balance and decrease the burden of the descending/ascending operation, which can increase the convenience.

To achieve the foregoing objectives and effects, the present invention implements the following technical scheme: a fixation joint; an active joint, connecting to a loading platform set; a pivot arm component installed between the fixation joint and the active joint, including a first pivot arm and a second pivot arm, wherein one end of the first pivot arm and one end of the second pivot arm are pivotally connected to the fixation joint, and the other end of the first pivot arm and the other end of the second pivot arm are pivotally connected to the active joint, the relation position of the first pivot arm, the second pivot arm, the pivot shaft of the fixation joint and the pivot shaft of the active joint substantially form a parallelogram, whereby the first pivot arm and the second pivot arm are able to pivot within a certain range, and the active joint descends or ascends relative to the fixation joint; a damping positioning mechanism, including an adjustable damper and a switch, wherein one end of the adjustable damper is installed on the pivot arm component, and the other end of the adjustable damper connects to the fixation joint or the active joint via an adjustment component; and the adjustable damper is connected to the switch via a control cord, and able to be controlled by the switch to be the adjustable status or the locked status; the adjustable damper is able to extend or retract and provides some damping support forse during the adjustable status, so the active joint is able to pivot relative to the fixation joint via the pivot arm component; the adjustable damper is able to fix the angle between the pivot arm component, and the active joint or fixation joint during the locked status for positioning; further, the adjustment component includes a first pivot seat capable of relatively moving, and the end of the adjustable damper pivotally connects to the first pivot seat, and the support angle of the adjustable damper is able to be changed by adjusting the position of the first pivot seat so as to adjust the damping support forse provided from the adjustable damper to support the loading platform set.

Thereby, the damper can provide proper damping support forse, and can sue the adjustment component to achieve balance in accordance with the total load born by the loading platform set. In addition, the switch controls the damper to extend or retract or get locked from extending or retracting. A user can easily move the loading platform set by pressing the switch an applying a minor force to reposition the loading platform set to a desired position. During the movement, the user does not need to hold and bear the loading platform set, and when moved to the desired position, the loading platform set can be easily positioned by the user's releasing the switch which locks the damper. The loading platform set is thus secured from being moved under external force, thereby significantly improving convenience in use.

In the configuration discussed above, the end of the adjustable damper connects to the first pivot arm or the second pivot arm via a second pivot seat.

In the configuration discussed above, the adjustment component further includes a lead screw, and the first pivot seat is mounted on the lead screw; when the lead screw revolves, the first pivot seat is able to move toward to lead screw.

In the configuration discussed above, the adjustment component further connects to an indicator mechanism for displaying the measurement of the damping support forse provided for the loading platform set.

In the configuration discussed above, the indicator mechanism includes a gear set connecting to the lead screw; the gear set is able to revolve by being linked to the lead screw, and display the measurement of the damping support forse provided for the loading platform set via an opening externally exposed to outside.

In the configuration discussed above, the indicator mechanism includes an indicator connecting to the first pivot seat, and the indicator is able to move with the first pivot seat, and display the measurement of the damping support forse provided for the loading platform set via a front end protruding outward.

In the configuration discussed above, the first pivot arm and the second pivot arm pivotally connect to an inner position and an outer position respectively via a plurality of shaft sleeves; the first pivot arm and the second pivot arm have lateral walls capable of overlapping with each other, whereby the lateral walls are able to partially overlap with each other when the first pivot arm and the second pivot arm are in operation.

In the configuration discussed above, wherein the active joint further includes a connection board and a locking sheet, and the first pivot arm and the second pivot arm are pivotally installed between the connection board and the locking sheet.

In the configuration discussed above, the locking sheet is fixed on the connection board via three points substantially form a triangle; the first pivot arm and the second pivot arm respectively pivotally connect to one of the three points.

In the configuration discussed above, the fixation joint is fixed at a base, a clamping base or a revolver.

In the configuration discussed above, the active joint connects to a platform or a pivot holder.

The invention as well as a preferred mode of use, further objectives and advantages thereof will be best understood by reference to the following detailed description of illustrative embodiments when read in conjunction with the accompanying drawings.

DETAILED DESCRIPTION OF THE INVENTION

Figure 1A:
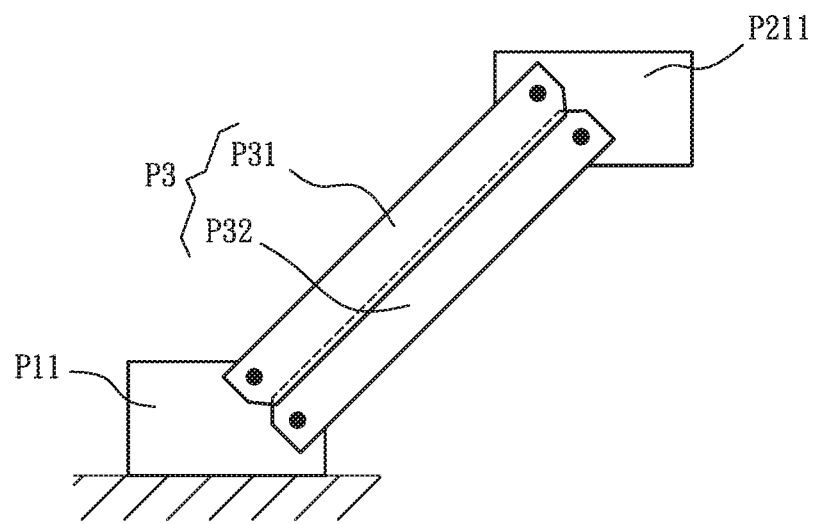
FIG. 1A and FIG. 1B are schematic views of an application mode of the present invention.
Figure 1B:
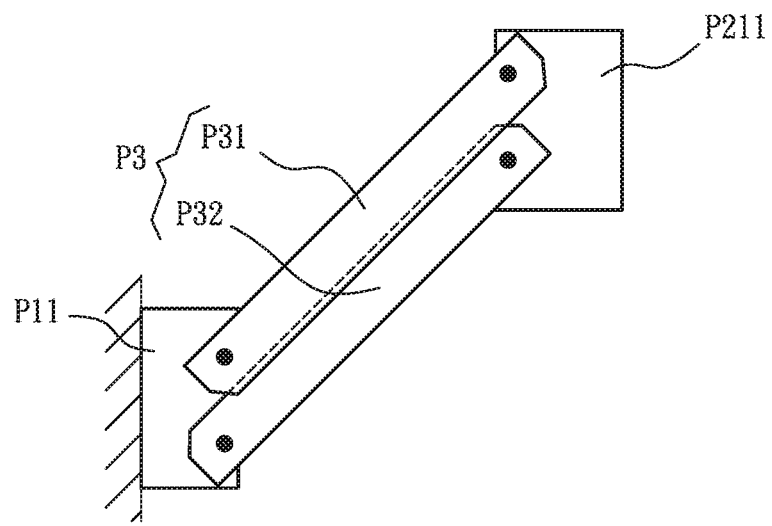

The present invention is majorly based on the pivot mechanism formed by two parallel pivot arms; the present invention can have many modes according to actual applications, but all of which are based on the same basic structure and operation principle. As shown in FIG. 1A and FIG. 1B, the pivot arm component P3 is pivotally installed between a fixation joint P11 and an active joint P211. The fixation joint P11 is usually the fixation end for forming a fixation support point; on the contrary, the active joint P211 is usually the active end for connecting to a platform capable of ascending/descending. Besides, the pivot arm component P3 has a first pivot arm P31 and a second pivot arm P32 parallel to each other, and the pivot shaft connection line between both ends of which, and the fixation joint P11 and the active joint P211 can just from a parallelogram, such that when the first and second pivot arms P31, P32 revolve, the active joint P211 can keep a constant angle displacement, and the platform connected to which can also horizontally ascend or descend. As shown in FIG. 1A, the pivotal connection position of the first and second pivot arms P31, P32 is slope (the included angle of the pivot shaft connection line of them and the horizontal plane is about) 45°, so they are suitable for 0~90° ascending/descending operations. As shown in FIG. 1B, the pivotal connection position of the first and second pivot arms P31, P32 is vertical, so they are suitable for −45~45° ascending/descending operations. In other words, many application modes can be provided according to the relation position of the first and second pivot arms P31, P32. FIG. 1A and FIG. 1B just show the preferred application modes of the present invention, which have the same structure of the pivot arm component P3 and the pivot operation principle.

Figure 2:
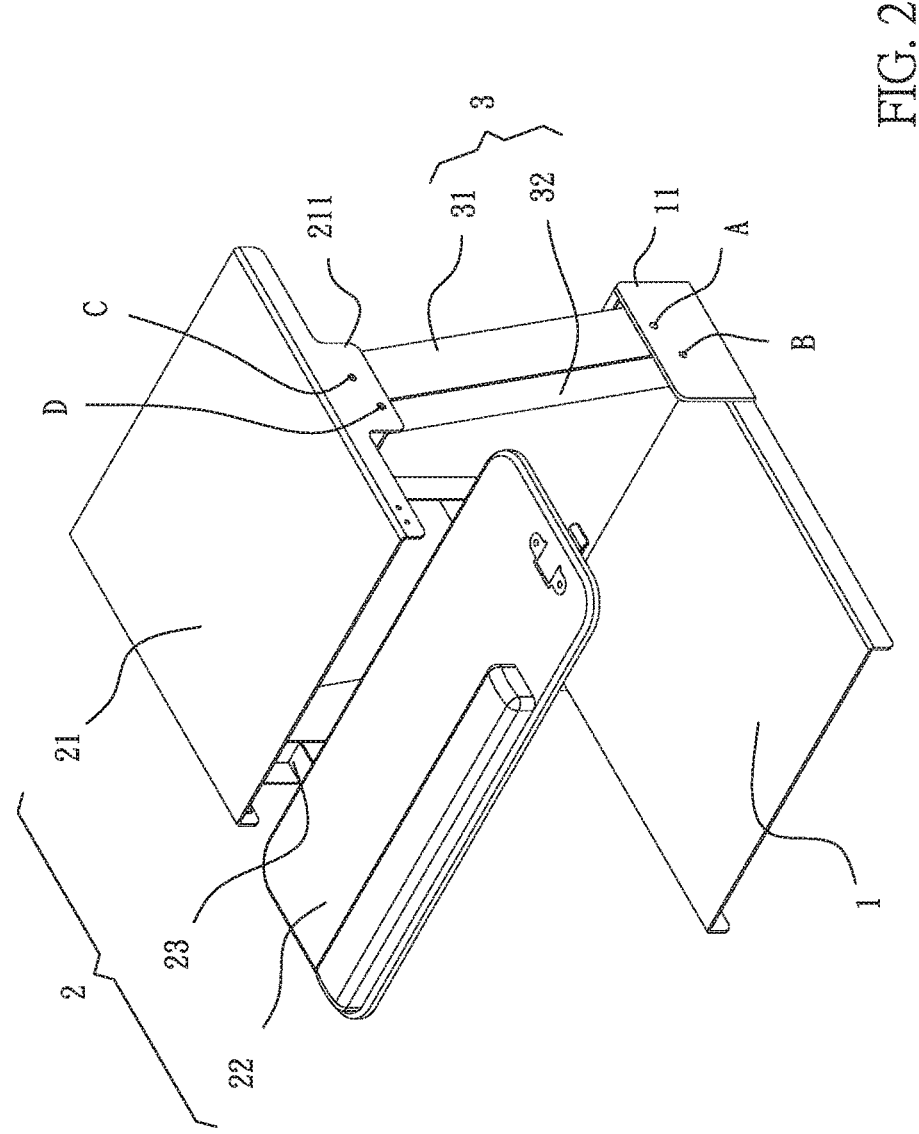
FIG. 2 is a 3D structure schematic view of a first embodiment of the present invention.
Figure 3:
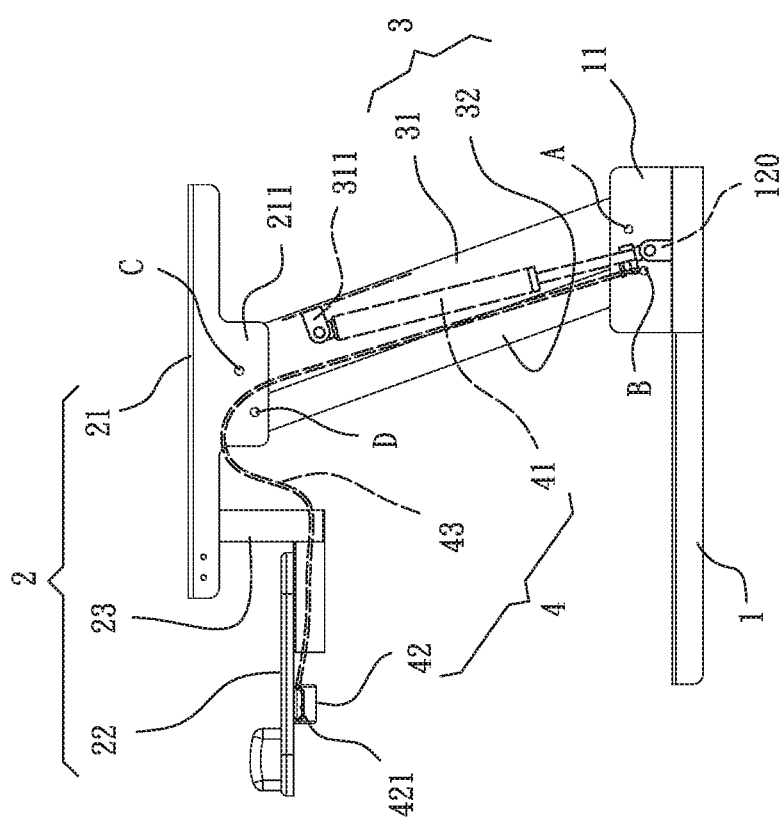
FIG. 3 is a status schematic side view of the first embodiment of the present invention, showing that it is positioned at a high position.

Referring to FIGS. 2 and 3, according to the first embodiment of the lifting mechanism with support function of the present invention, the disclosed mechanism comprises: a loading component 1, a loading platform set 2, a pivot arm component 3, and a damping positioning mechanism 4. Therein, the loading component 1 is locally provided with a fixation joint 11, and the fixation joint 11 contains therein a first pivot seat 12.

In the present embodiment, the loading component 1 is a flat base, which can be stably placed on a predetermined plane, and the joint 11 and the first pivot seat 120 are installed on the base.

The loading platform set 2 is composed of a first loading platform 21 and a second loading platform 22. The first and second loading platform 21, 22 are connected to each other by means of an extension support 23, so that the first and second loading platforms 21, 22 are mutually parallel and have an altitudinal difference therebetween. The first loading platform 21 is provided with an active joint 211.

The pivot arm component 3 is composed of a first pivot arm 31 and a second pivot arm 32 that are parallel to each other. The first and second pivot arms 31, 32 each have one end pivotally connected to the fixation joint 11 of the loading component 1 by means of a pin A or B, and each have an opposite end pivotally connected to the active joint 211 of the loading platform set 2 by means of a pin C or D, so that the corresponding ends of the pins A, B, C and D jointly define a parallelogram. The first pivot arm 31 is provided with a second pivot seat 311.

In the present embodiment shown in the drawings, the first and second pivot arms 31, 32 are telescoped, so as to eliminate the risk of mutual interference therebetween in practical operation. In general, the first and second pivot arms 31. 32 can have the lateral walls capable of overlapping with each other; shaft sleeves can be installed on the pivot shafts, so the lateral walls of the first and second pivot arms 31, 32 can be located the inner side and the outer side respectively, and will not interfere with each other during the pivot process; besides, the lateral walls can keep a partially overlapping status during the pivot operation, such that the fingers of the user will not be hurt because of being clamped by the arms.

The damping positioning mechanism 4 is composed of an adjustable damper 41 (that may be a gas cylinder with locking function) and a switch 42. The adjustment damper 41 is pivotally connected between the second pivot seat 311 of the first pivot arm 31 and the first pivot seat 120 of the loading component 1, and the adjustable damper 41 is connected to the switch 42 by means of a control cord 43. The switch 42 may be placed at one side of the second loading platform 22 and may have an operatable paddle 421. When the paddle 421 is operated, the switch 42 controls the adjustable damper 41 to allow it to extend or retract in response to an external force. When the paddle 421 is released, the adjustable damper 41 locks itself from extending and retracting.

Figure 4:
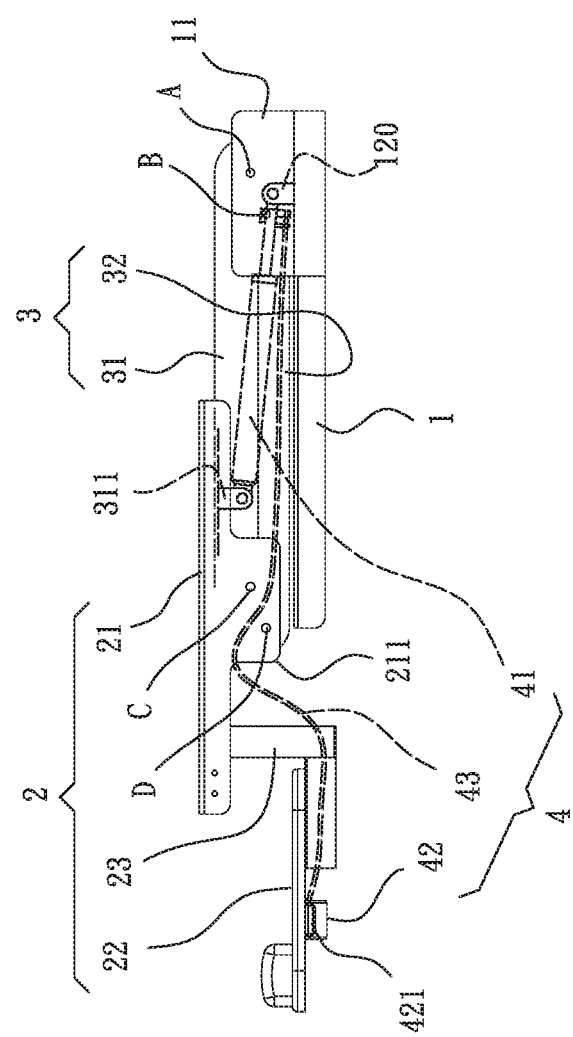
FIG. 4 is a status schematic view of the first embodiment of the present invention, showing that it is positioned at a low position.

Referring to FIG. 4, according to the first embodiment of the present invention, during the positional adjustment, when the paddle 421 is operated, the second loading platform 22 can be pushed or pressed at the same time by a user, so that the loading platform set 2 drives the first and second pivot arms 31, 32 to rotate relatively. Throughout the process of the rotation, the imaginary line connecting the pins C and D remains parallel to the imaginary line connecting the pins A and B (holding the parallelogram), so the loading platform set 2 is restricted to move forward/backward and upward/downward while remaining parallel to the loading component 1. With the pivotal movement of the first pivot arm 31, the adjustable damper 41 receives force and is driven to extend or retract.

When the loading platform set 2 moves to a desire position, the user may release the paddle 421, so that the adjustable damper 41 is locked and prevented from extending and retracting, making the loading platform set 2 positioned. Thereby, even if the loading platform set 2 (the first and second loading platforms 21 and 22) receives external force (such as that from a user's palms pressing the second loading platform 22 when operating a keyboard placed on the second loading platform 22), it is unlikely to have unintentional displacement, making its use more convenient.

Figure 5:
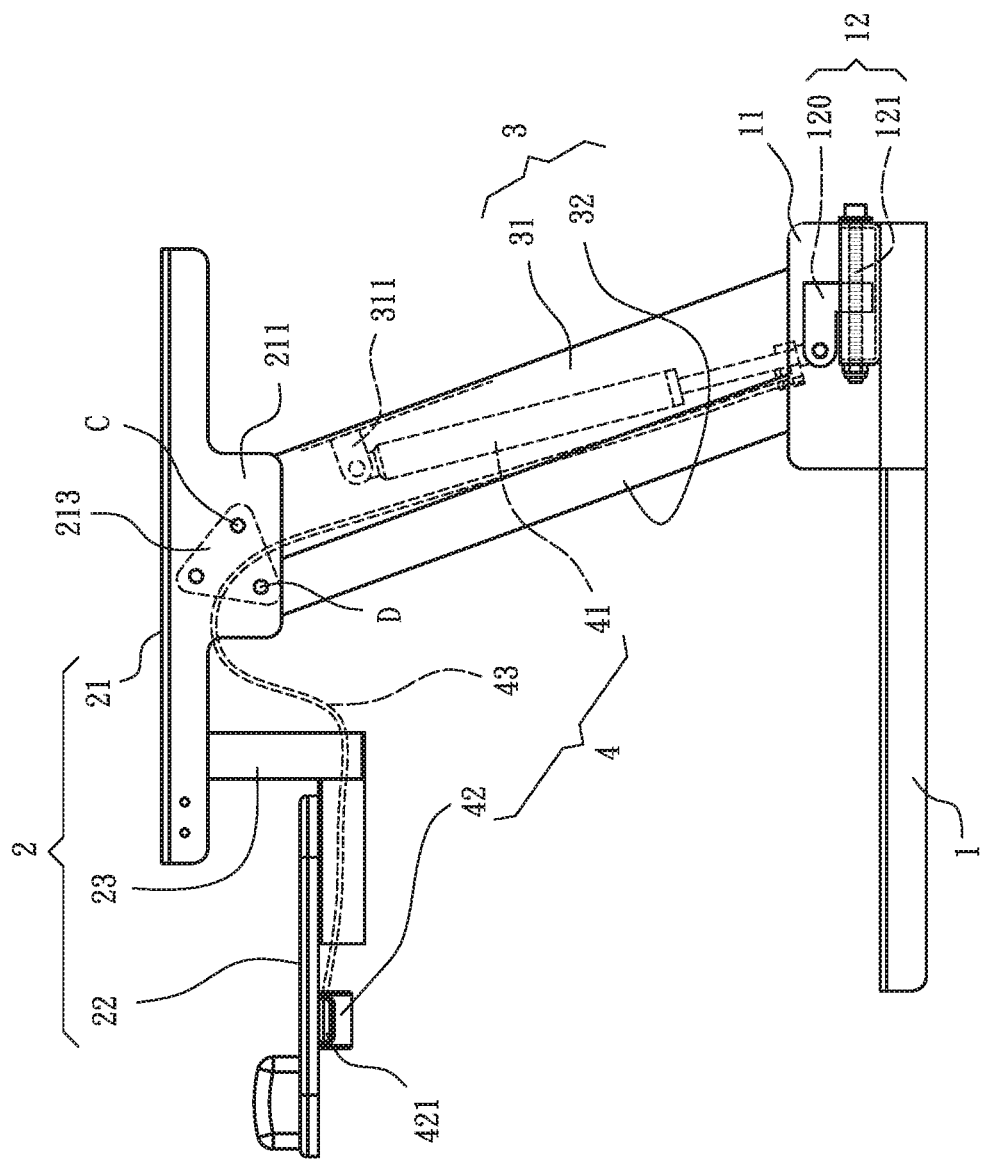
FIG. 5 and FIG. 6 are schematic views of the first embodiment with an adjustment component of the present invention, showing it is positioned at the low position and the high position respectively.
Figure 6:
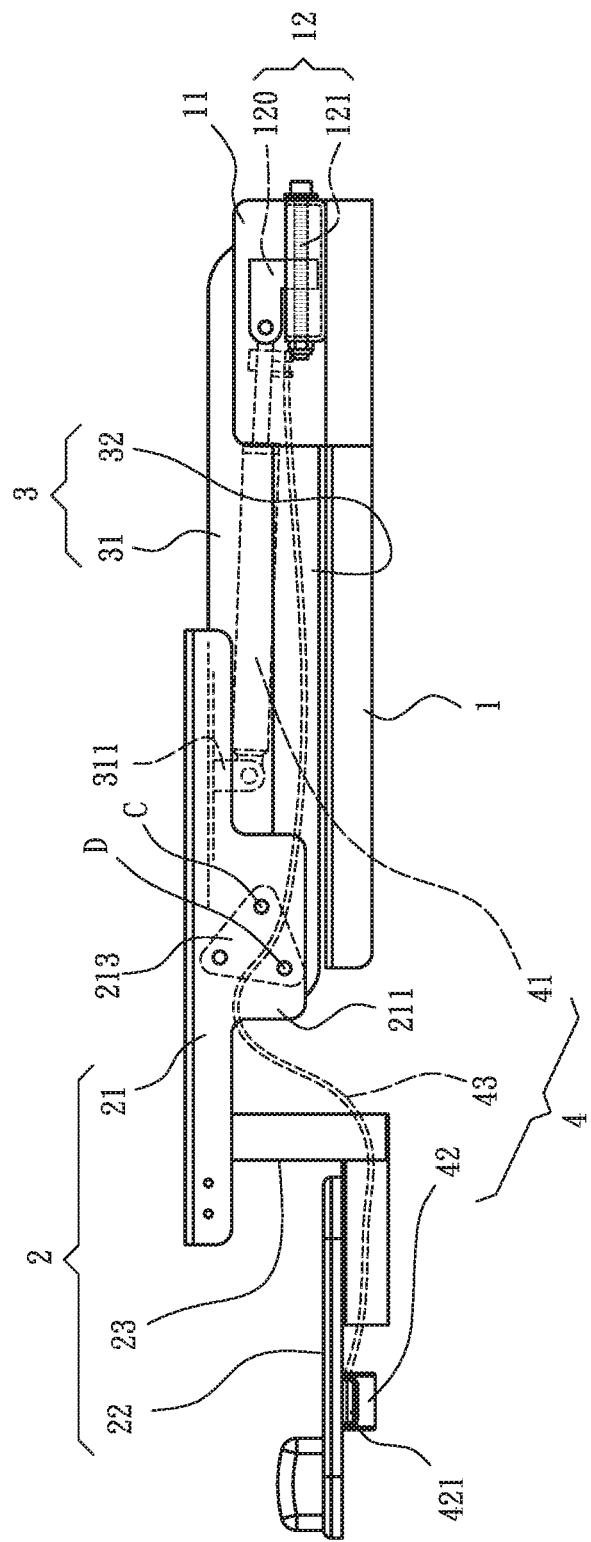
Figure 7:
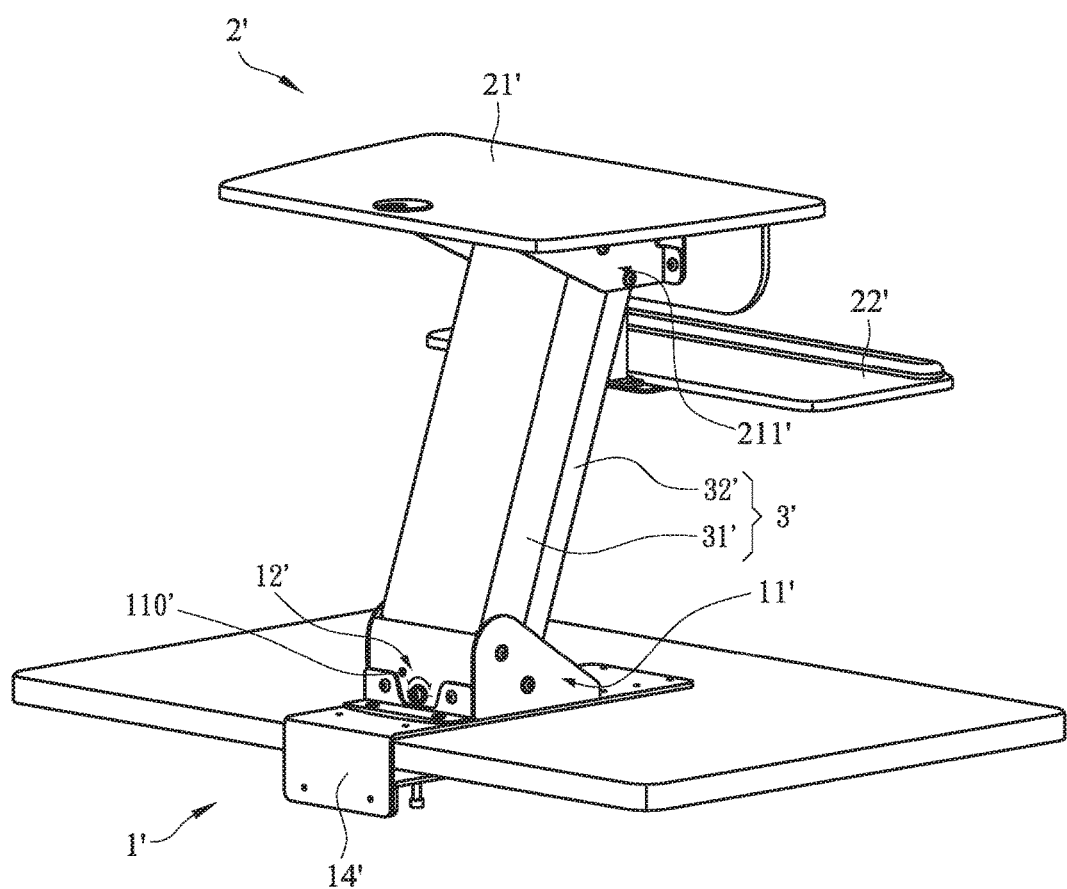
FIG. 7 is a 3D structure schematic of a second embodiment of the present invention.

In general, when the user operates the paddle 421, the adjustable damper 41 usually generates certain damping support forse to the loading platform set 2 so as to support the weight on the loading platform set 2, such that the force for lifting or pressing down provided by the user can be reduced; thus, the user can easily operate the loading platform set 2 to ascend or descend. Moreover, as shown in FIGS. 5 and 6, the adjustable damper 41 can further connect to the loading component 1 or the fixation joint 11 via an adjustment component 12. The adjustment component 12 majorly includes a first pivot seat 120 and a lead screw 121. The lead screw 121 is fixed at the loading component 1 and the first pivot seat 120 is installed on the lead screw 121. By means of the rotation of the lead screw 121, the first pivot seat can have relative displacement; when the first pivot seat 121 moves, the support angle of the adjustable damper 41 can be changed, so its damping support forse to the loading platform set 2 can be adjusted. Therefore, the use can adjust the damping support forse according to the load of the loading platform set 2 to achieve balance between them. In this way, when the user operates the paddle 421, the user has no need to lift (the table is too heavy) or press down (the table is too light), such that the use can perform the ascending/descending operations without difficulty.

In a feasible embodiment, the adjustment component 12 can further connect to an indicator mechanism for showing the adjustable damper 41's damping support forse to the loading platform set 2 as the indicator for the user to adjust. Moreover, the pivotal connection position of the active joint 211, and the first and second pivot arms can be further installed with a locking sheet 213 with three fixation points, which can concentrate the stress and fix the relative position of them. For the reason, the loading platform set 2 will not be unstable because the arms intersect with each other or due to the stress difference. The following embodiments will provide more detailed description about the technical features of the indicator mechanism and the locking sheet.

Please refer to FIG. 7~FIG. 11, which shows the second embodiment of the lifting mechanism with support function of the present invention; the mechanism also includes a loading component 1', a loading platform set 2', a pivot arm component 3' and a damping positioning mechanism 4, etc. The major difference is that the shape of the pivot arm component 3' is changed, and the loading component 1' has a clamping base 14' capable of being fixed at a default plane or carrier.

More specifically, the loading component 1' is connected to a fixation joint 11' and the loading platform set 2' is connected to an active joint 211'. The pivot arm component 3' has a first pivot arm 31' and a second pivot arm 32' parallel to each other. One end of the first and second pivot arms 31', 32' is pivotally connected to the fixation joint 11' and the other end thereof is pivotally connected to the active joint 211'; the positions of the pivotal connection shafts can form a parallelogram.

Figure 14:
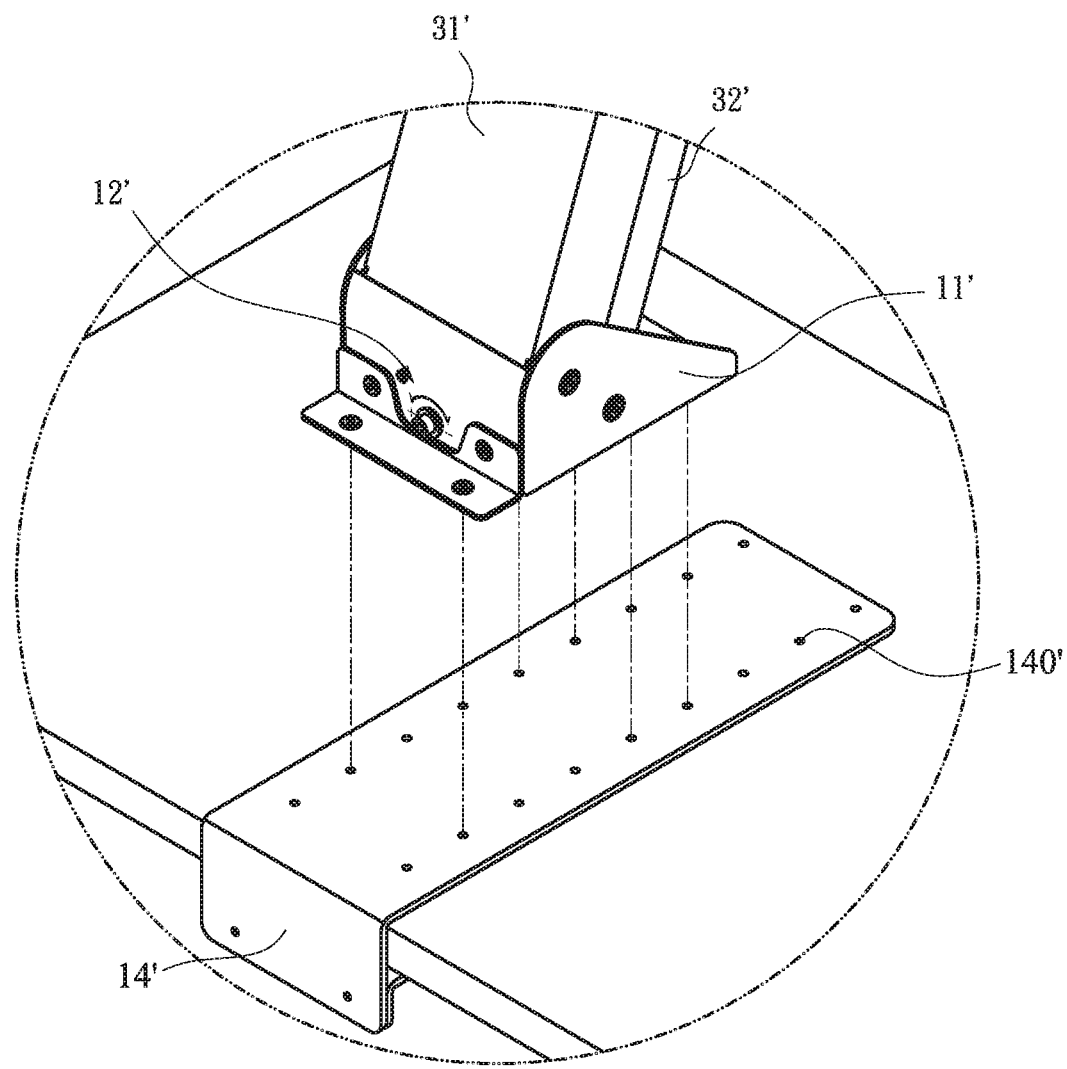
FIG. 14 is an assembly schematic view of a fixation joint and a clamping base of the second embodiment of the present invention.
Figure 15:
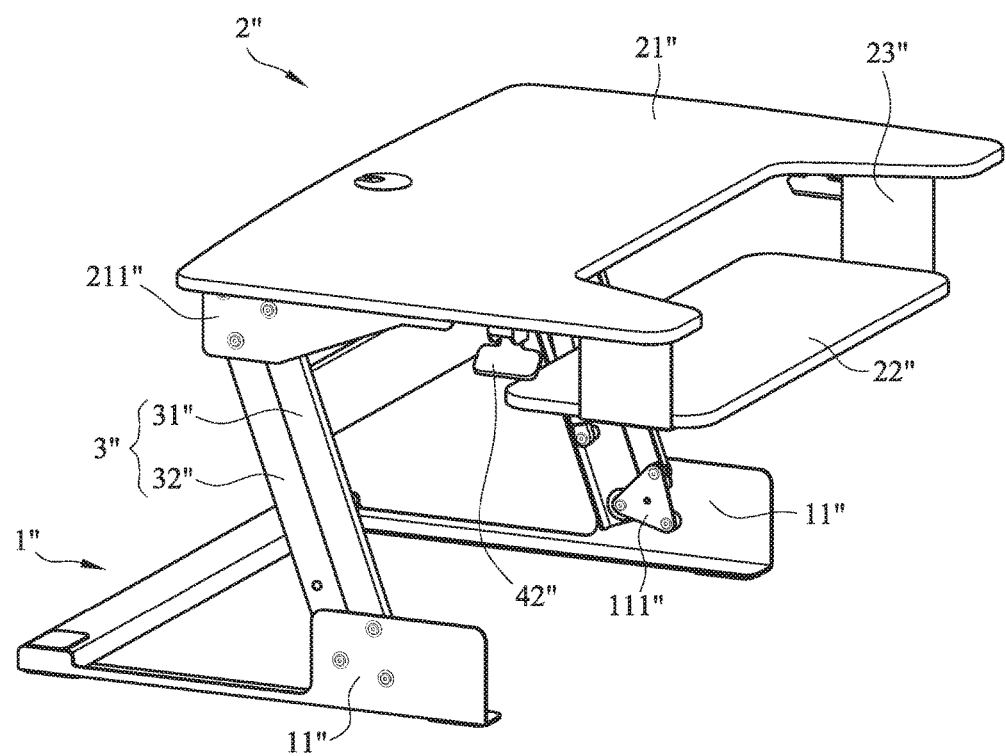
FIG. 15 is a 3D structure schematic of a third embodiment of the present invention.
Figure 16:
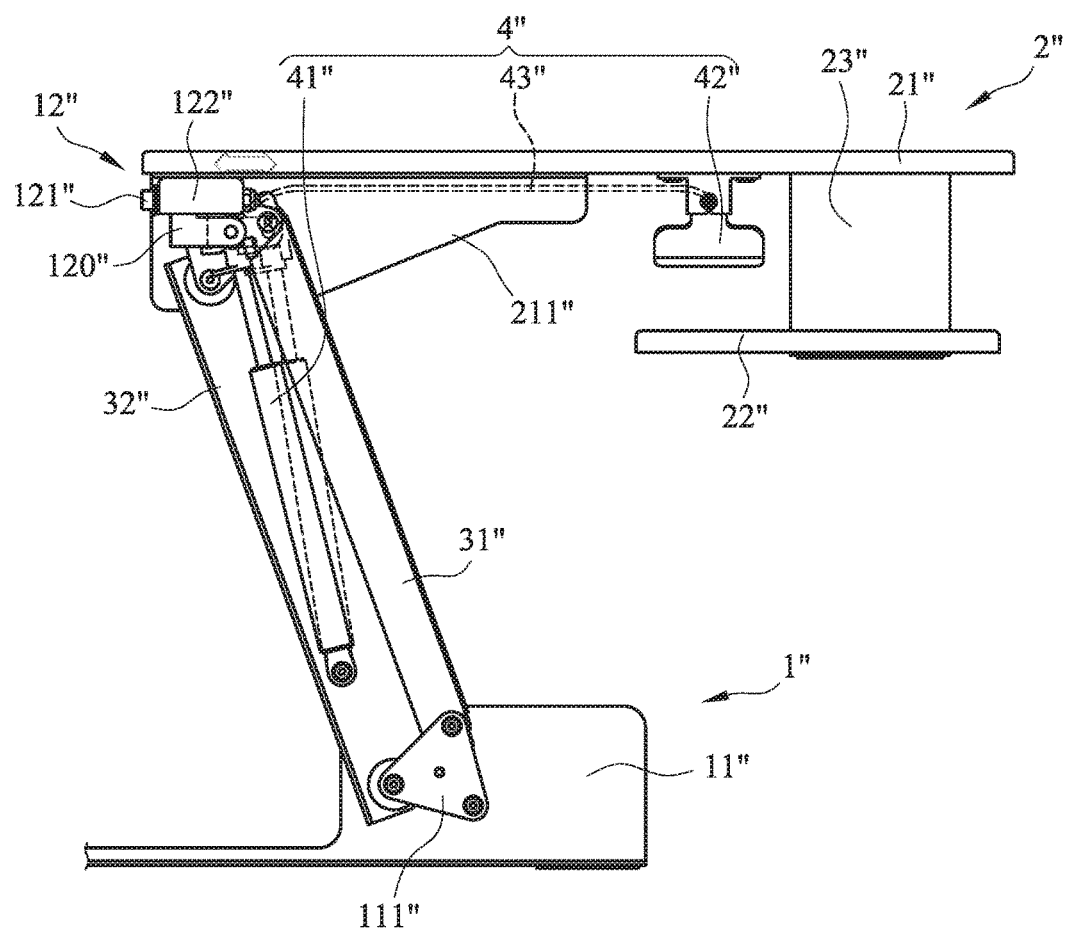
FIG. 16 is an operation schematic view of an adjustment component of the third embodiment of the present invention.

In the embodiment, the loading component 1' include a clamping base 14' and a fixation joint 11'; please also refer to FIG. 14, the clamping base 14' can clamp and be fixed at a default object, and have a plurality of arranged locking connection holes 140', such that the fixation joint 11' can connect to the proper position of the clamping base 14' to increase its usability. The loading platform set 2' includes a first loading platform 21', a second loading platform 22' and an extension holder 23' connecting them with each other, so the first and the second loading platforms 21', 22' can be parallel to each other, and have a height difference; the active joint 211' can stably connect to the bottom of the first loading platform 211'.

Figure 8:
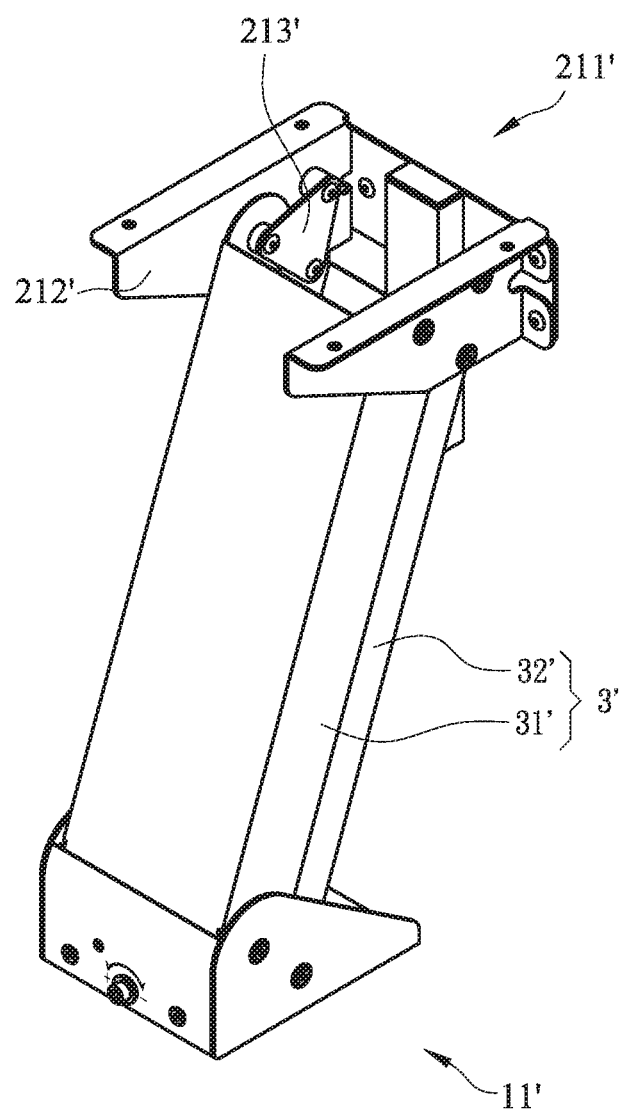
FIG. 8 is a structure schematic view of the main structure of a lifting mechanism with support function of the second embodiment of the present invention.
Figure 9:
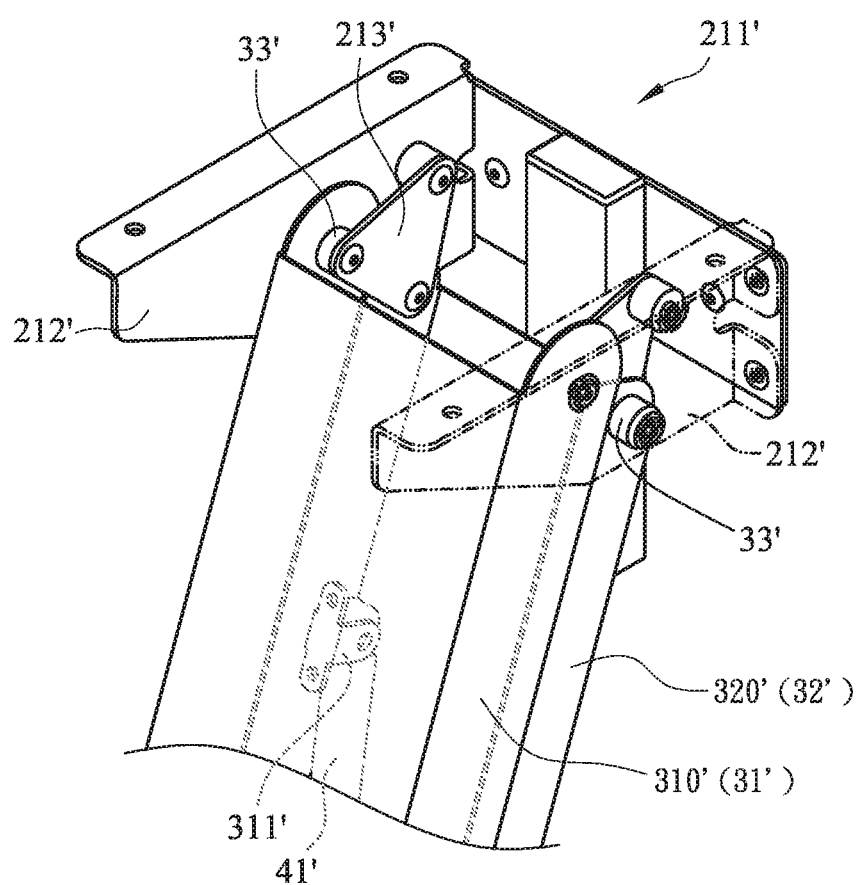
FIG. 9 and FIG. 10 are local perspective views of the lifting mechanism with support function of the second embodiment of the present invention.

The first and second pivot arms 31', 32' of the pivot arm component 3' are arranged adjacent to each other and sleeved with each other to form an inner hollow space; as shown in FIGS. 8 and 9, the inner sides or the outer sides of the pivotal connection shafts of the first and the second pivot arms 31', 32' are installed with a plurality of shaft sleeves 33', such that the lateral walls 310', 320' of the first and second pivot arms 31', 32' can overlap with each other without interfering with each other during the pivot operation. Further, the lateral walls 310', 320' thereof can keep partially overlapping with each other during the pivot operation, which can prevent foreign objects from entering inside the first and the second pivot arms 31', 32' in order to prevent the user from being accidentally hurt because of being clamped by them. Moreover, so as to increase the stability of the mechanism, a locking sheet 213' can be further installed on the pivotal connection position of the active joint 211', and the first and second pivot arms 31', 32'. The locking sheet 213' are fixed at connection board 212' of the active joint 211' by using three pins as the fixation points. The first and second pivot arms 31', 32' are pivotally installed between the connection board 212' and the locking sheet 213', and located at two of the fixation points respectively, such that the stress can be concentrated to fix the relative position; in this way, the loading platform set 2' will not be unstable because the pivot arms intersect with each other or the stress is changed.

Figure 10:
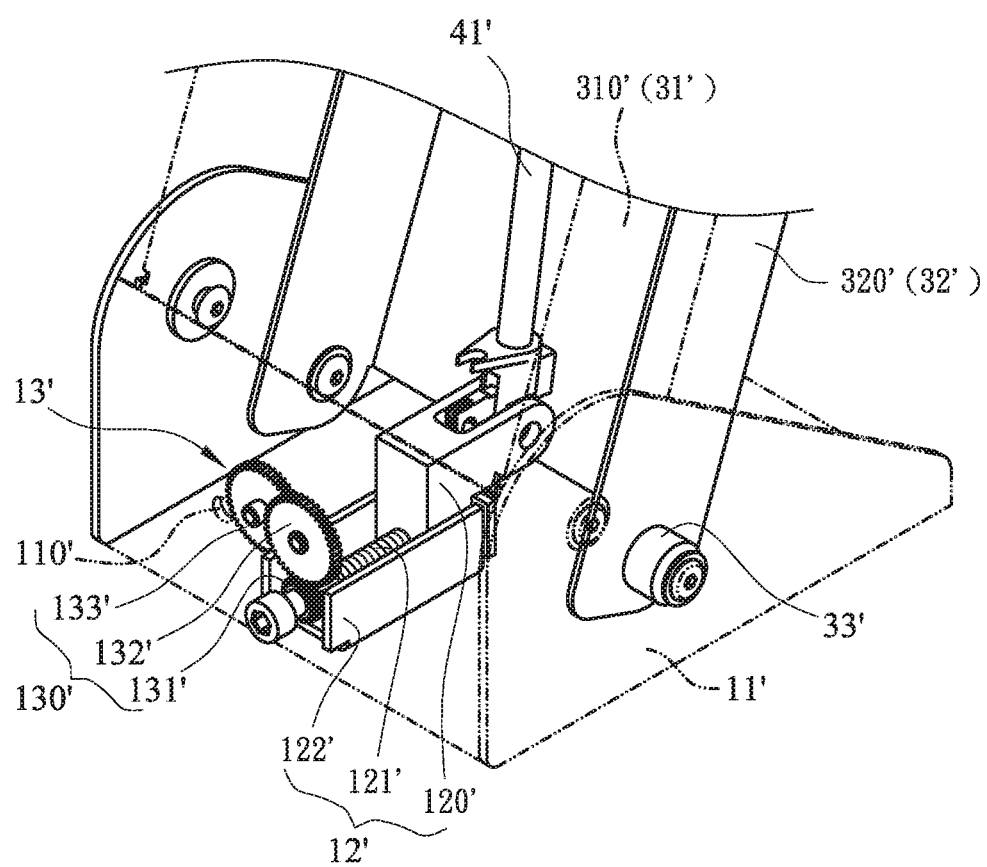
Figure 11:
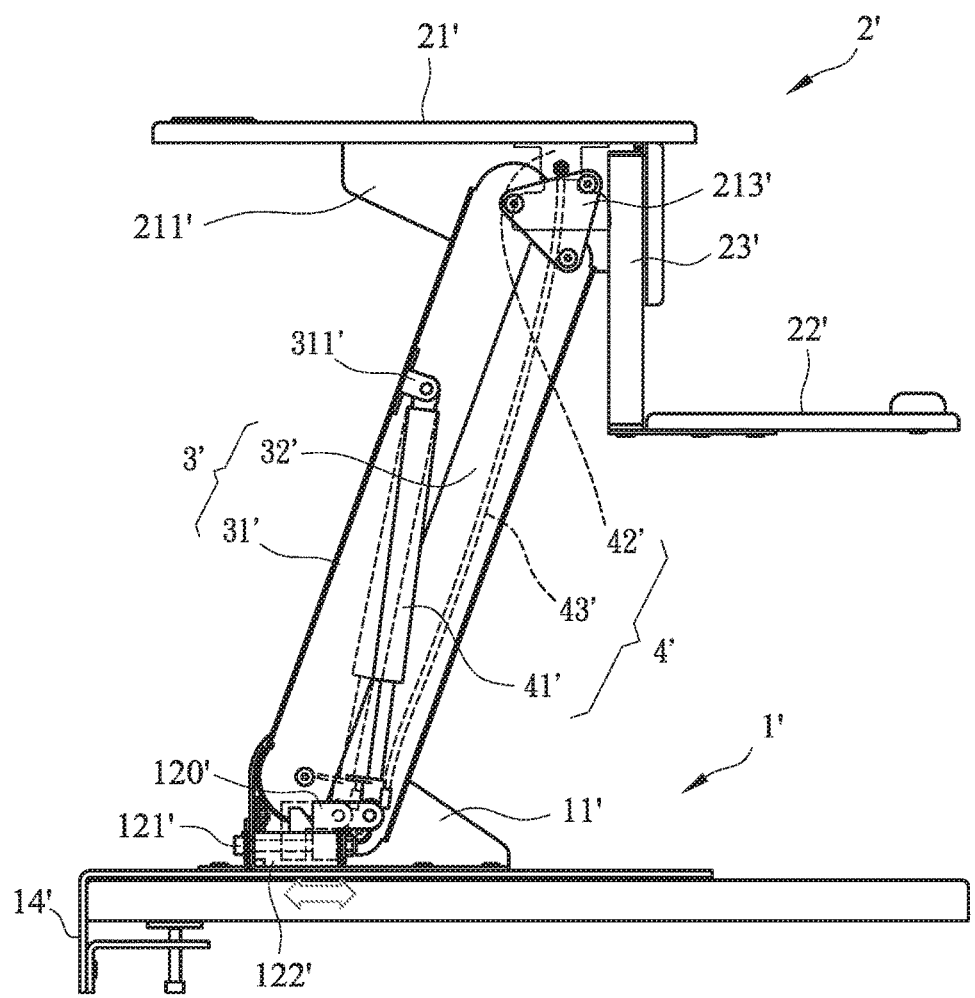
FIG. 11 is an operation schematic view of an adjustment component of the second embodiment of the present invention.

Please refer to FIG. 10~FIG. 13, the damping positioning mechanism 4' mainly includes an adjustable damper 41' and a switch 42'; more specifically, one end of the adjustable damper 41' pivotally connects to the second pivot seat 311' of the first pivot arm 31', and the other end thereof pivotally connects to the adjustment component 12' of the fixation joint 11'; further, the adjustable damper 42' can connect to the switch 42' via a control cord 43'. The adjustment component 12' majorly includes a first pivot seat 120' capable of relatively moving and a lead screw 121' capable of driving the first pivot seat 120'. The first pivot seat 120' is installed on the lead screw 121', and the lead screw 121' can be installed in a slot way 122'. The lead screw 121' can revolve to drive the first pivot seat 120' to move toward the lead screw 121'. The adjustable damper 41' pivotally connects to the first pivot seat 120', so the support angle of the adjustable damper 41' can be changed (as shown in FIG. 11) when the first pivot seat 120' relatively moves so as to change the damping support forse of adjustable damper 41' provided for the loading platform set 2'.

Figure 12:
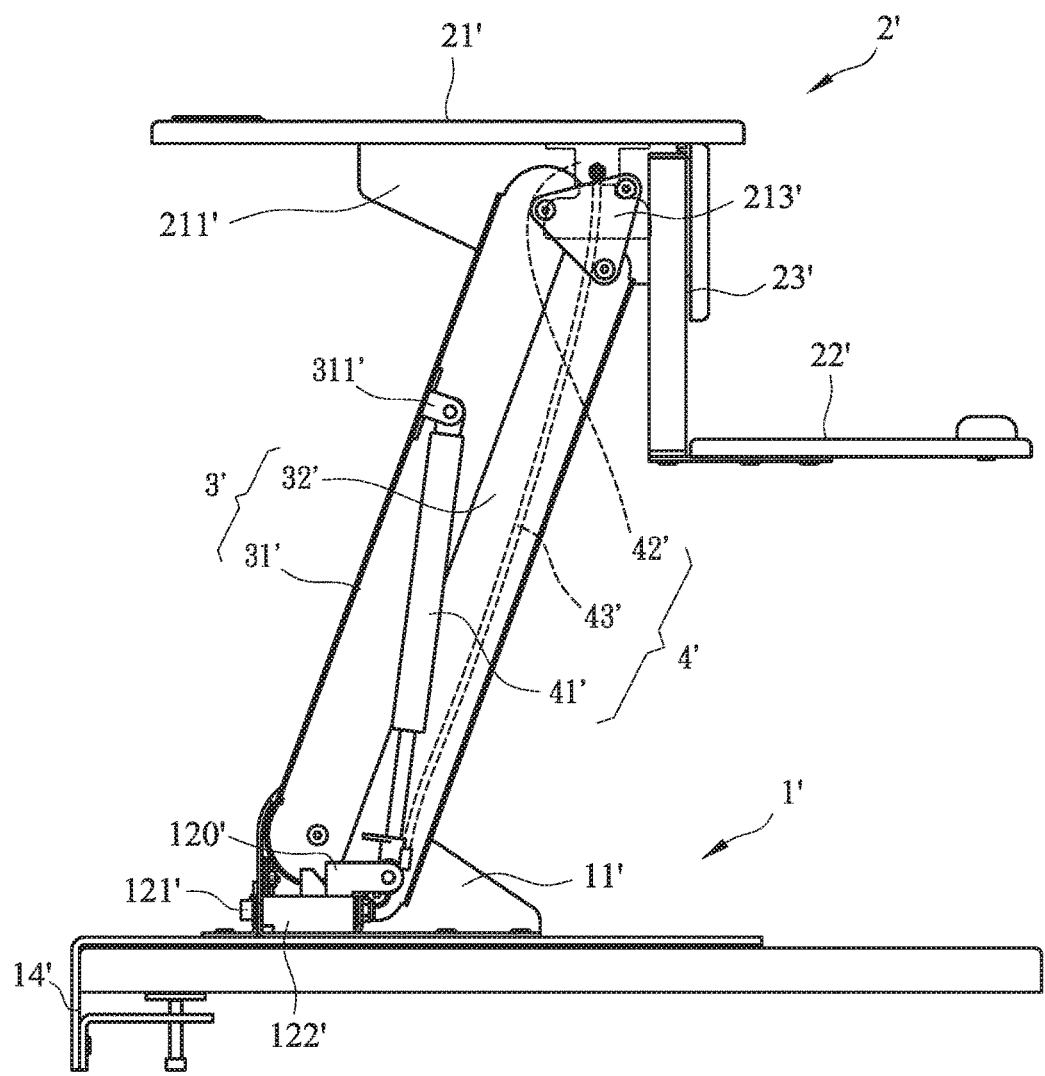
FIG. 12 and FIG. 13 are status schematic views of the second embodiment of the present invention, showing it is positioned at the low position and the high position respectively.
Figure 13:
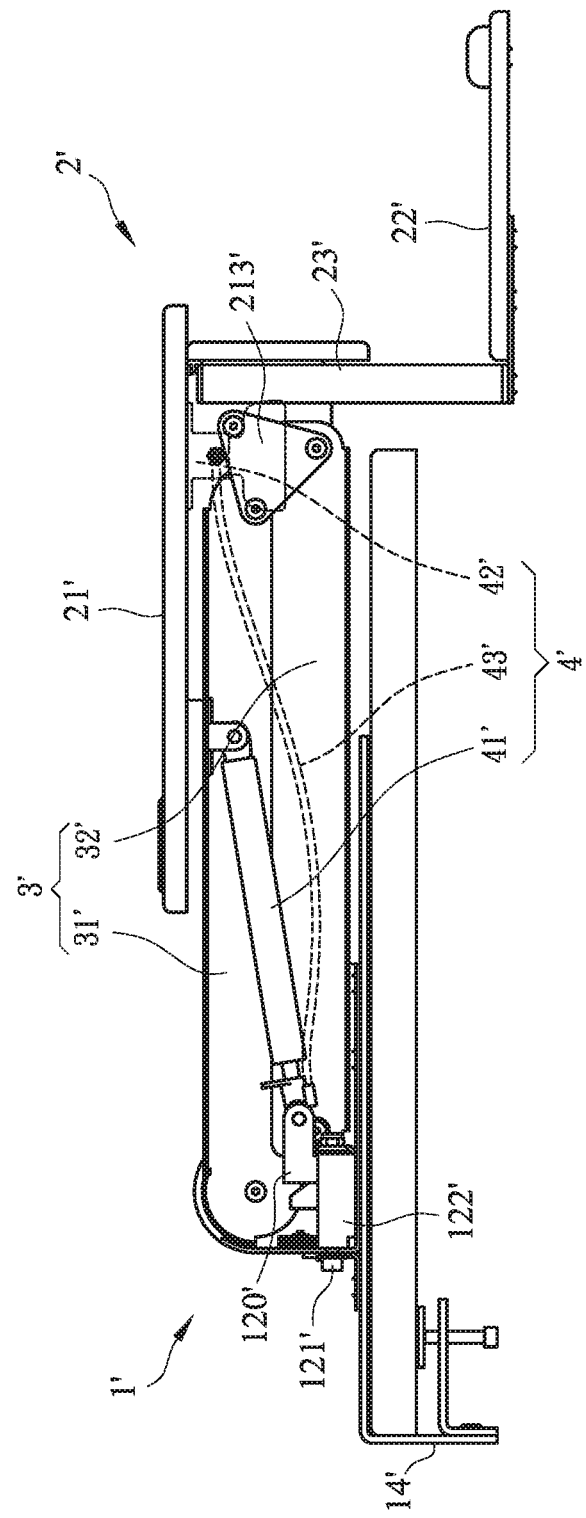

When actually using the mechanism, the user can touch the switch 42' to make the adjustable damper 41' be the adjustable status; then, the user can operate the loading platform set 2' to drive the first and second pivot arms 31', 32' to relatively revolve. Besides, during the pivot process, the parallelogram formed by the arrangement of the pivot shafts can make the loading platform set 2' horizontally ascend or descend (as shown in FIG. 12 and FIG. 13). After reaching the proper position, the user can release the switch 42' to lock the adjustable damper 41', so the loading platform set 2' can be well positioned. In addition, during the usage process, the user can adjust the lead screw 121' according to the requirements in order to make the damping support forse provided for the loading platform set 2' reach balance with the load. In this way, when performing the ascending/descending operations, the user has no need to apply the lifting force (the table is too heave) or pressing-down force (the table is too light), so the user can easily and conveniently operate the mechanism.

In a feasible embodiment, the adjustment component 12' can connect to an indicator mechanism 13' so as to show the corresponding damping support forse for the user to observe and adjust. In the embodiment, as shown in FIG. 10, the indicator mechanism 13' majorly includes a gear set 130' composed of a first gear 131', a second gear 132' and a third gear 133'. The lateral side of the third gear 133' can have a force meter, and which can expose from an opening 110' at the relative position for the user to perform the adjustment according the shown force (corresponding to the load).

Please refer to FIG. 15~FIG. 18, which show the third embodiment of the lifting mechanism with support function of the present invention; the major changes are the shape of the pivot arm component 3" and the pivotal connection position of the adjustable damper 41". As shown in these figures, the main structure includes a loading component 1", a loading platform set 2", a pivot arm component 3" and a damping positioning mechanism 4".

The loading component 1" is basically a horizontal frame, which can be installed on and fixed at the surface of a common table, or a default carrier; the right side and the left side of which extend upward respectively to form a fixation joint 11" for the pivot arm component 3" to pivotally connect to. The loading platform set 2" includes a first loading platform 21" capable of horizontally load an object, and a second loading platform 22" connecting to the first loading platform 21" via the extension holder 23" to form a height difference. The two sides of the bottom of the first loading platform 21" connect to an active joint 211" for the pivot arm component 3" to connect to.

The pivot arm 3" includes two first pivot arms 31" and two second pivot arms 32" located at two sides thereof respectively. One end of each of the first and second pivot arms 31", 32" connects to the fixation joint 11", and the other end of each of them connects to the active joint 211". The positions of the pivotal connection shafts can substantially form a parallelogram.

In order to keep the stability of the structure, the active joint 211" has a locking sheet 213", and the locking sheet 213" connects to the connection board 212" of the active joint 211" by using three shafts as the fixation points. In this way, the first and second pivot arms 31", 32" can form the intersecting and overlapping status without interfering with each other during the pivot operation, and both of them can keep partially overlapping with each other during the pivot operation so as to reduce the accidents. The locking sheet 213" can concentrate the stress on the pivotal connection point and fix the relative position, so the loading platform set 2" will not be unstable because the arms intersect with each other or due to the stress difference. Similarly, the fixation joint 11" further includes a locking sheet 111" for enhancing the stability between the fixation joint 11", and the first and second pivot arms 31", 32".

In the embodiment, the two sides are respectively installed with a damping positioning mechanism 4", which majorly include an adjustable damper 41" and a switch 42". One end of the adjustable damper 41" is installed on the second pivot arm 32" of the pivot arm component 3", and the other end thereof connects to the active joint 211" via an adjustment component 12". The switch 42" connects to the adjustable damper 41" via a control cord 43" to control the adjustable damper 41" to be the adjustable status or the locked status. The adjustment component 12" mainly includes a first pivot seat 120" and a lead screw 121". The first pivot seat 120" is installed on the lead screw 121", and the adjustable damper 41" connects to the first pivot seat 120". The lead screw 121" can be installed in a slot way 122" and the slot way 122" is fixed at the active joint 211" for further fixation. The lead screw 121" can revolve to drive the first pivot seat 120" to relatively move, and then change the support angle of the adjustable damper 41" connecting to the first pivot seat 120", such that the damping support forse (vertical force component) of the adjustable damper 41" provided for the loading platform set 2" can be adjusted so as to achieve balance with the load and decrease the burden of the descending/ascending operation.

Figure 17:
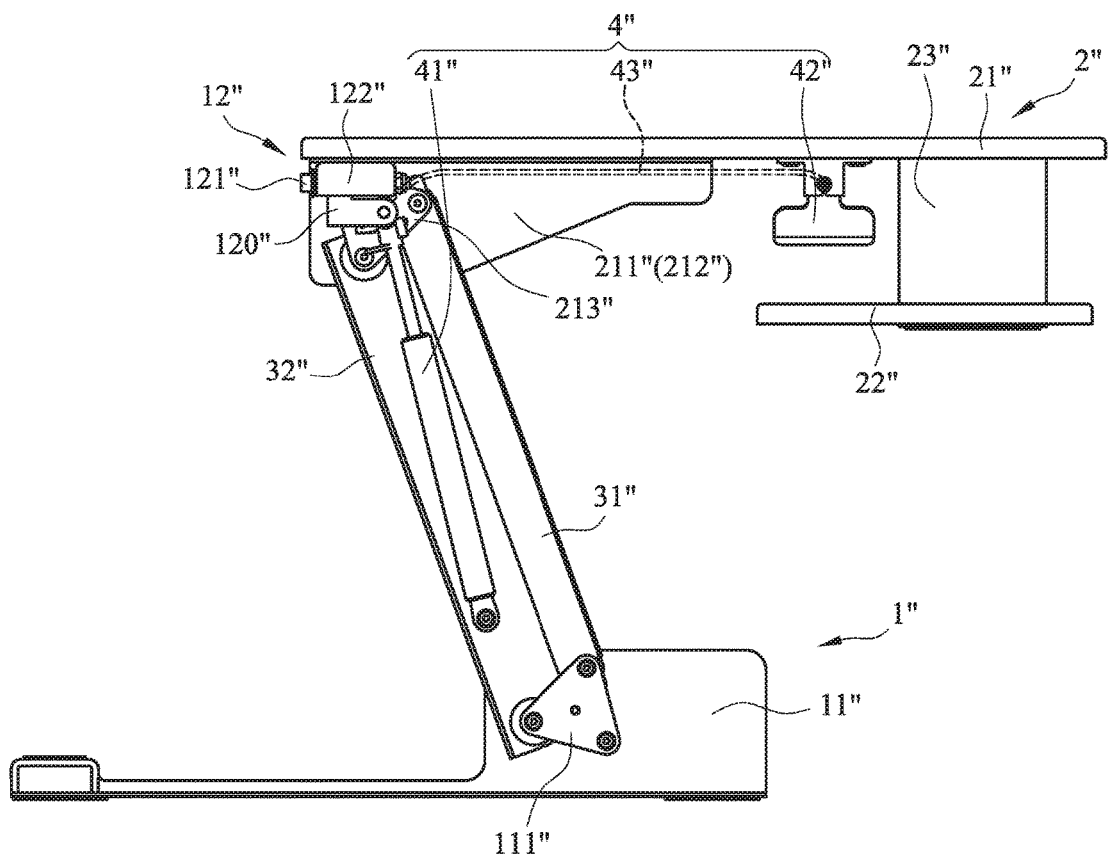
FIG. 17 and FIG. 18 are status schematic views of the third embodiment of the present invention, showing it is positioned at the low position and the high position respectively.
Figure 18:
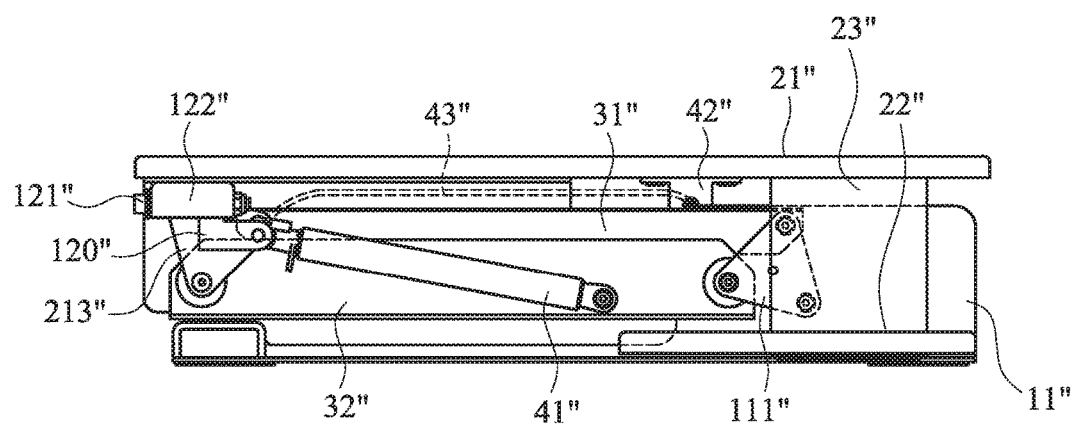
Figure 19:
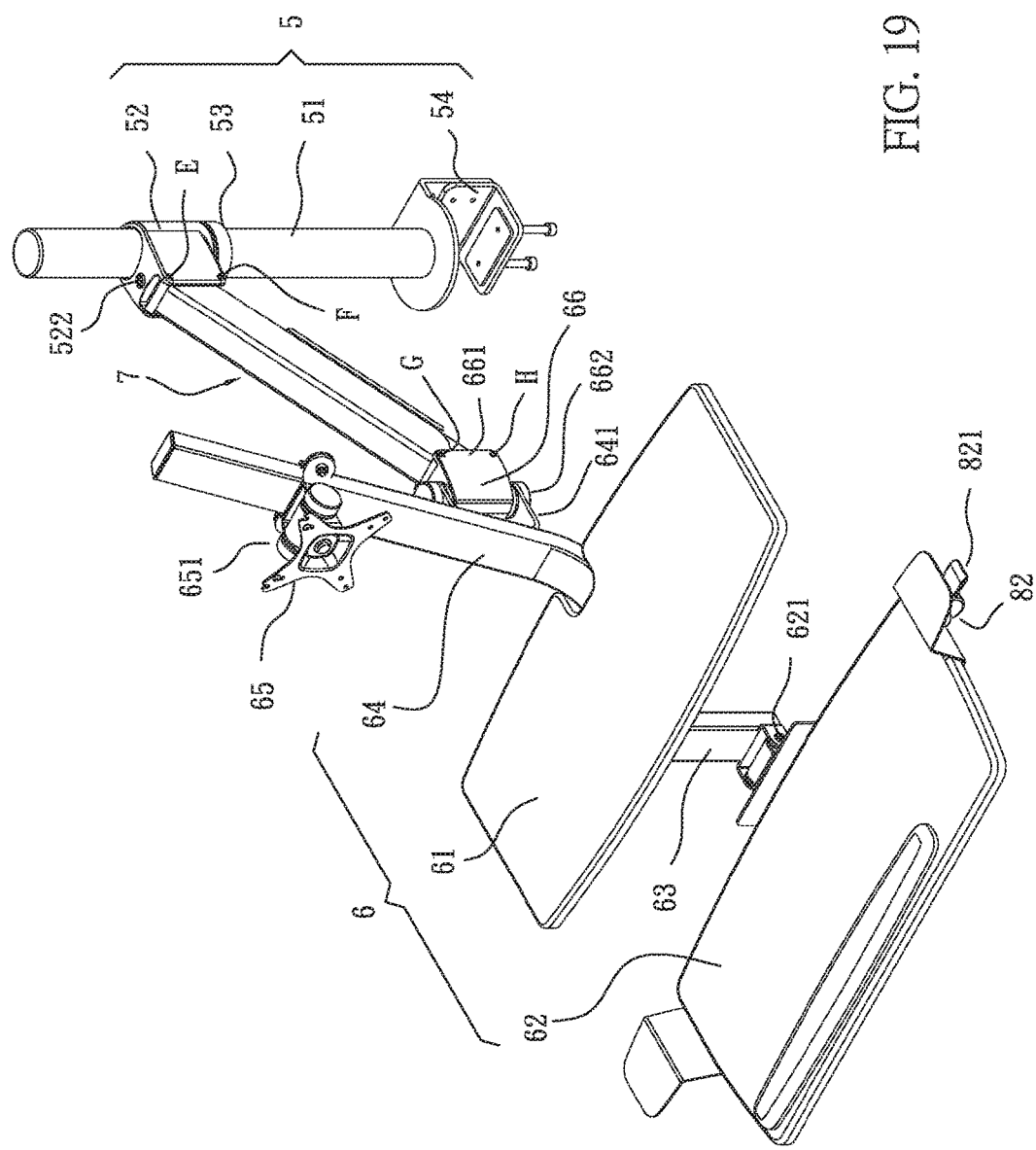
FIG. 19 is a 3D structure schematic view of a fourth embodiment of the present invention.
Figure 20:
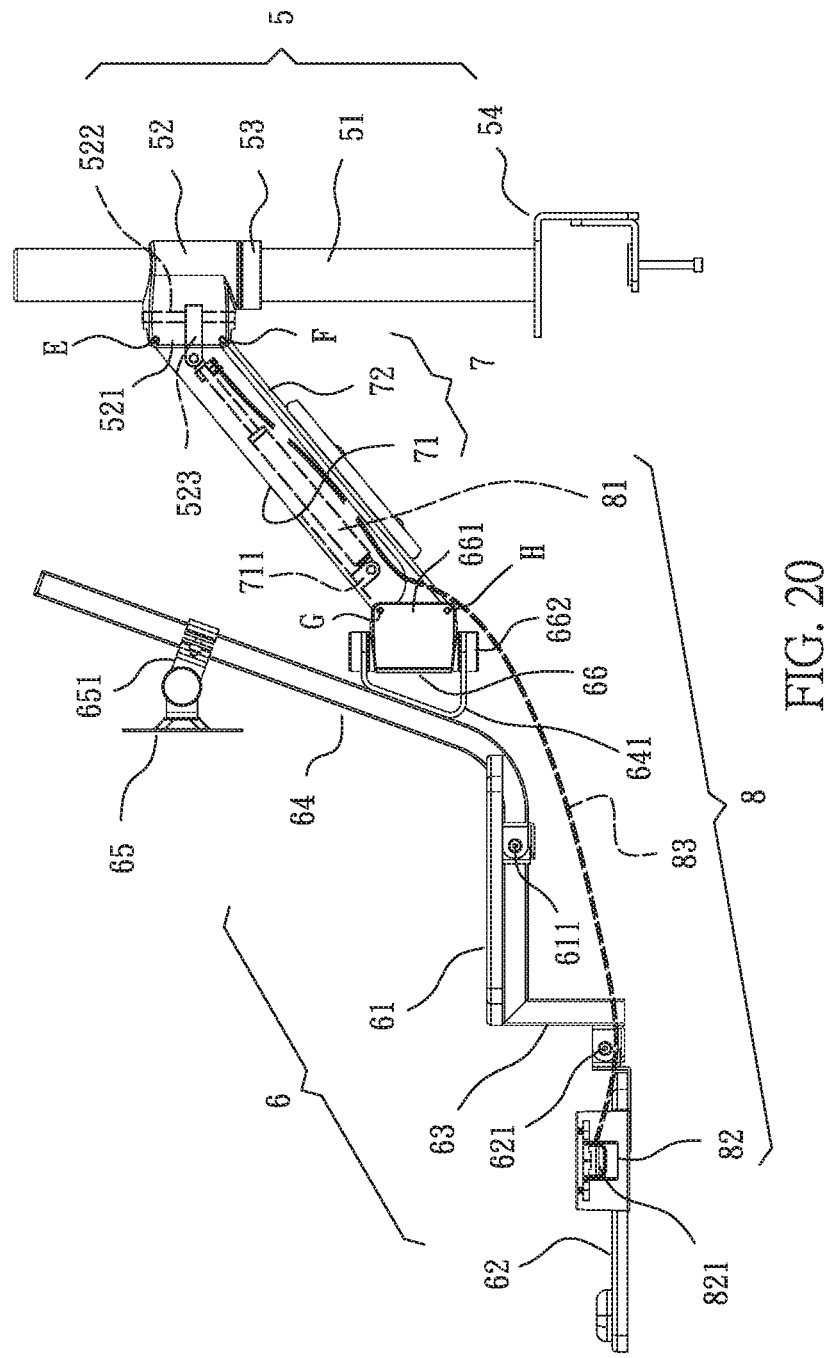
FIG. 20 is a status schematic side view of the fourth embodiment of the present invention, showing that it is positioned at a low position.

As shown in FIGS. 17 and 18, which show the mechanism is positioned at the high position and the low position respectively. In actual operation, when the switch 42" is operated, the adjustable damper 411" can be adjusted to be the adjustable status (i.e. the adjustable damper 41" can freely extend or retract); at this time, the user can freely operate the loading platform set 2" to ascend or descend so as to adjust it to the desired height; after the adjustment is done, the user can stop pressing the switch 42", and then the adjustable damper 41" returns to the locked status (i.e. the adjustable damper 41" cannot freely extend or retract) in order to fix the loading platform set 2" at the desired height.

According to the previous embodiments, one end of the adjustable damper 41" can be freely and selectively installed on one of the first pivot arm 31" and the second pivot arm 32" of the pivot arm component 3", and the other end thereof can freely and selectively connect to the loading platform set 2" or the loading component 1".

Further referring to FIGS. 19-23, which show the fourth embodiment of the present invention, the main structure comprises: a loading component 5, a loading platform set 6, a pivot arm component 7 and a damping positioning mechanism 8. Therein, the loading component 5 is composed of a guiding post 51, a revolver 52 and a retainer 53. The guiding post 51 has its one end provided with a clamp 54 configured to hold an external article or table and position the self-positionable lifting device with respect to the article or table. The revolver 52 and the retainer 53 are mounted around the middle part of the guiding post 51, and the retainer 53 is fixed below the revolver 52. With the retaining force from the retainer 53, the revolver 52 is rotatably positioned at the set altitude on the guiding post 51. The revolver 52 has a fixation joint 521 and an inner pivot shaft 522, and a first pivot seat 523 is pivotally connected to the inner pivot shaft 522.

The loading platform set 6 is composed of a first loading platform 61, a second loading platform 62, a pivotable support 64 and a pivotal connector 66. The first and second loading platforms 61 and 62 are mutually connected by means of an extension support 63, so that the first and second loading platforms 61 and 62 are parallel to each other and have an altitudinal difference therebetween.

The pivotal connector 66 has an active joint 661 and a pivotal shaft 662 parallel to the guiding post 51. The pivotable support 64 has its one end connected to the first loading platform 61 (or the second loading platform 62). At the middle part of the pivotable support 64, a connector 641 and an adjustable holder 651 are provided. The connector 641 is pivotally mounted around the pivotal shaft 662, and the adjustable holder 651 is adjustablty fixed to the middle part of the pivotable support 64. The adjustable holder 651 is pivotally provided with a mount 65 that is configured to hold an external device (such as an LCD).

In a feasible embodiment, the first loading platform 61 is pivotally connected to the terminal of the pivotable support 64 by means of a first pivot 611. The extension support 63 may be combined with the first loading platform 61. The second loading platform 62 is pivotally connected to the terminal of the extension support 63 by means of a second pivot 621.

The pivot arm component 7 is composed of a first pivot arm 71 and a second pivot arm 72 that are parallel to each other. The first and second pivot arms 71 and 72 each have one end pivotally connected to the fixation joint 521 of the loading component 5 by means of a E or F, and each have an opposite end pivotally connected to the active joint 661 of the loading platform set 6 by means of a pin G or H. The corresponding ends of the pins E, F, G and H jointly define a parallelogramic area. The first pivot arm 71 is provided with a second pivot seat 711.

In the present embodiment shown in the drawings, the first and second pivot arms 71, 72 are telescoped, so as to eliminate the risk of mutual interference therebetween in practical operation.

The damping positioning mechanism 8 is composed of an adjustable damper 81 (that may be a gas cylinder with locking function) and a switch 82. The adjustable damper 81 is pivotally connected between the second pivot seat 711 of the first pivot arm 71 and the first pivot seat 523 of the loading component 5, and the adjustable damper 81 is connected to the switch 82 by means of a control cord 83. The switch 82 may be placed at one side of the second loading platform 62 and may have an operatable paddle 821.

When the paddle 421 is operated, the switch 82 controls the adjustable damper 81 to allow it to extend or retract in response to an external force. When the paddle 821 is released, the adjustable damper 81 locks itself from extending and retracting.

Figure 21:
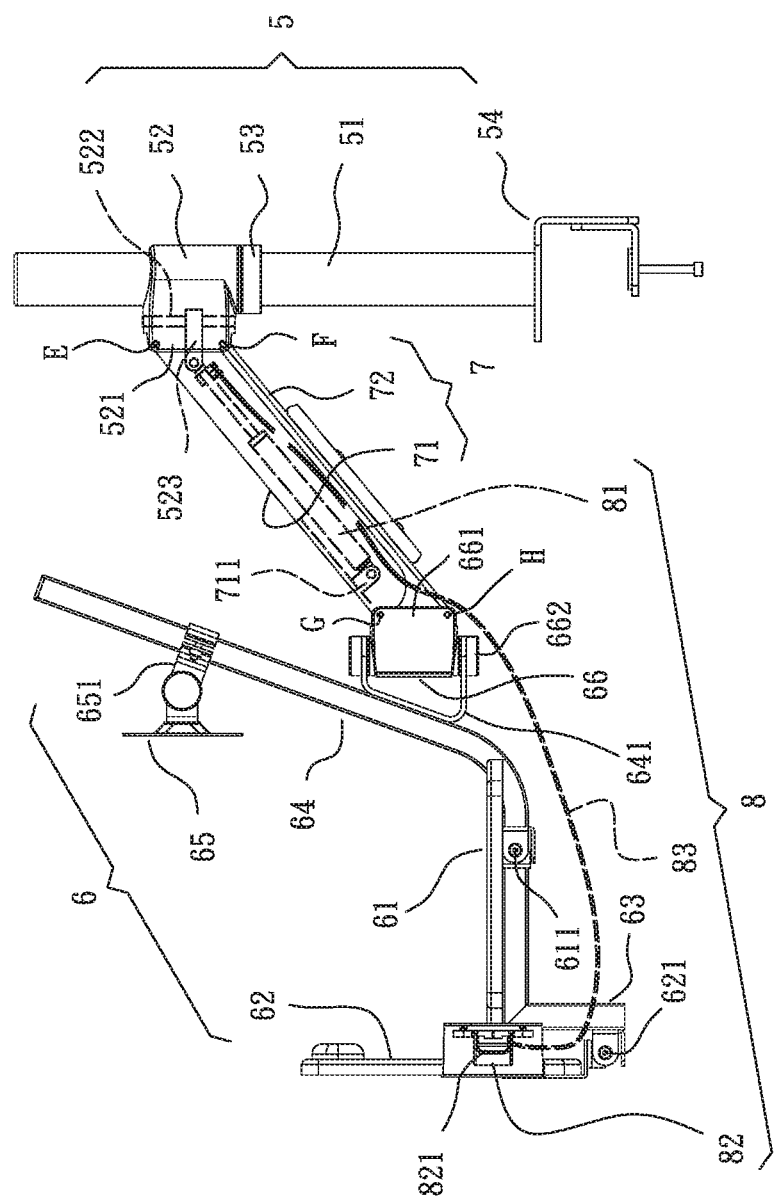
FIG. 21 is a status schematic side view of the fourth embodiment of the present invention, showing that the second loading platform is folded upward.
Figure 22:
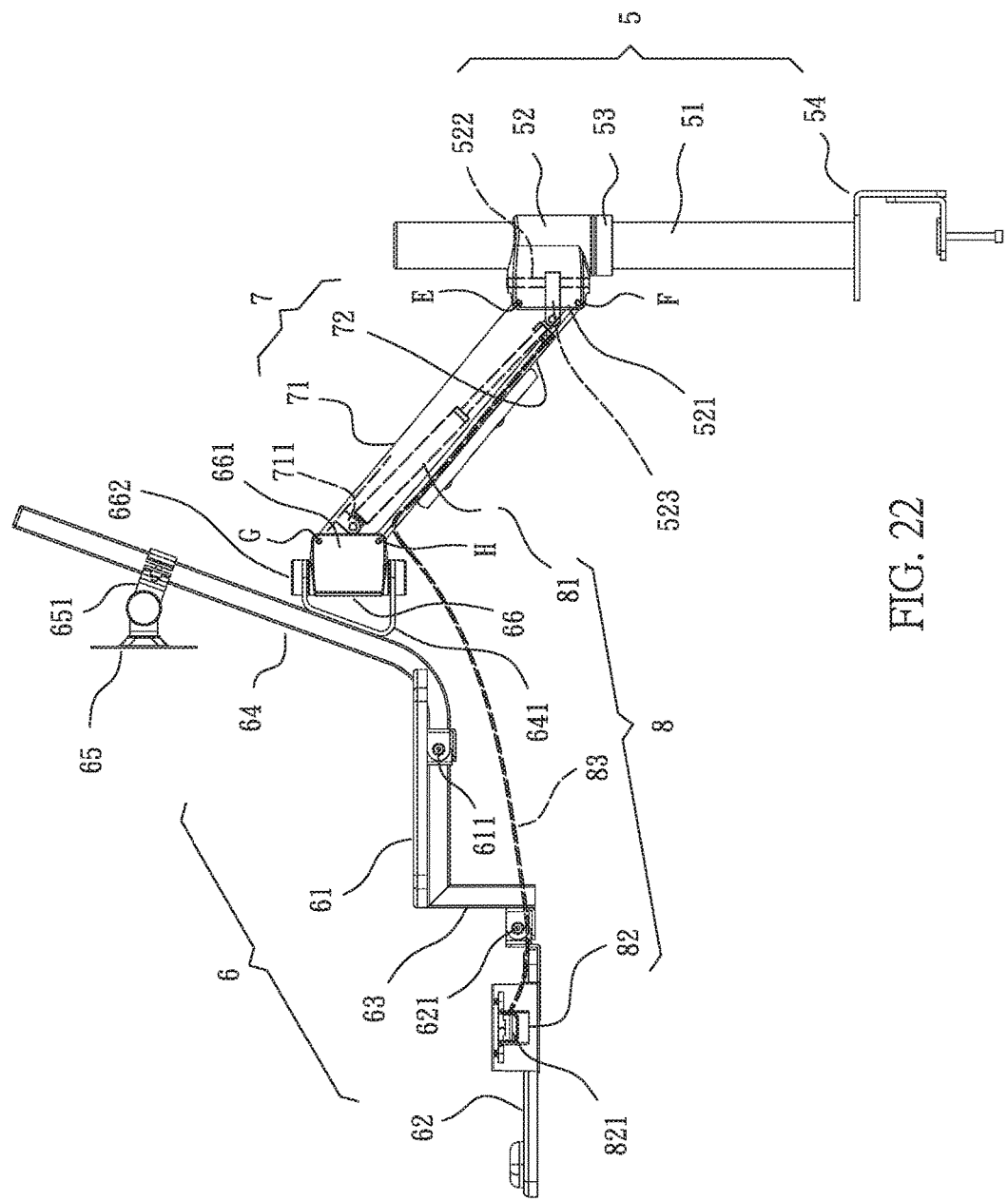
FIG. 22 is a status schematic side view of the fourth embodiment of the present invention, showing that it is positioned at a high position.
Figure 23:
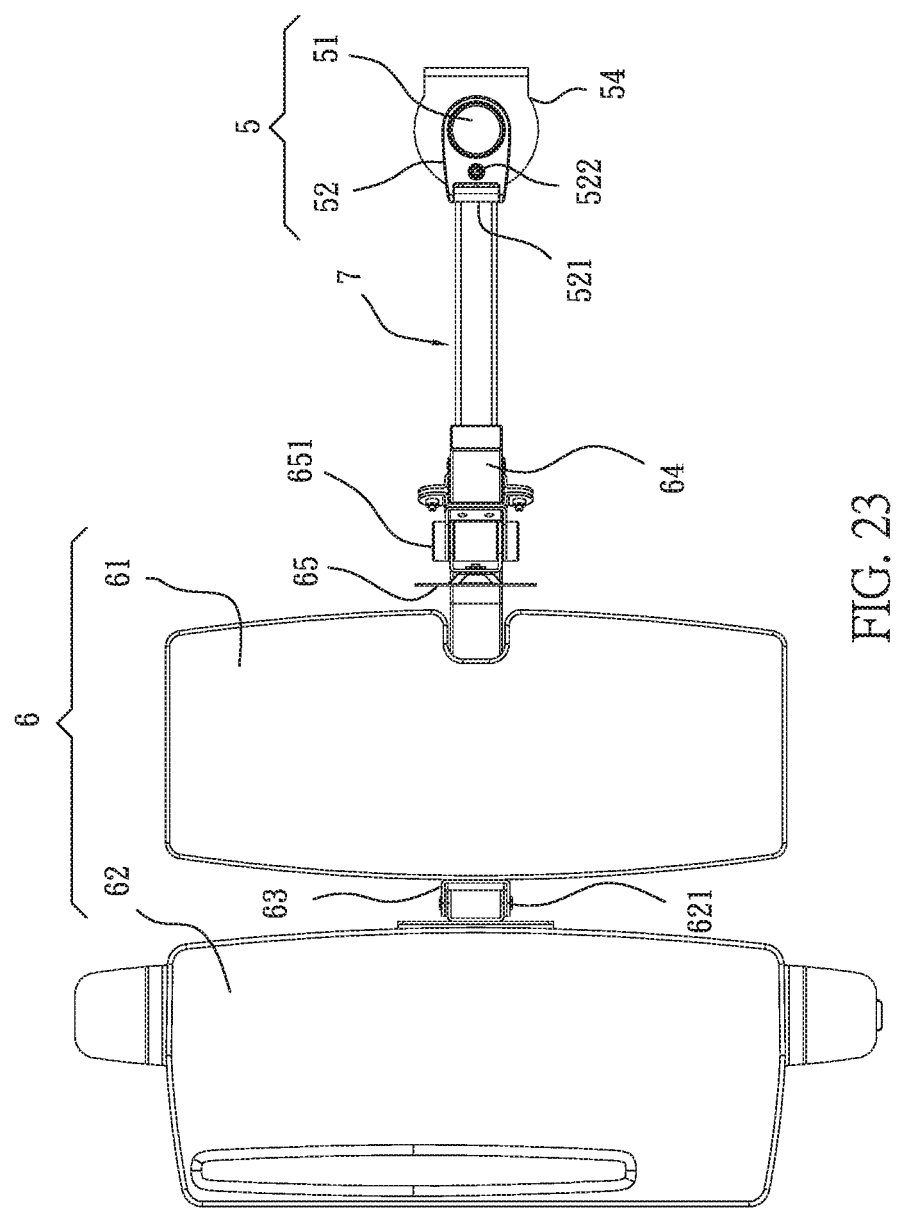
FIG. 23 is a top view of the fourth embodiment of the present invention.
Figure 24:
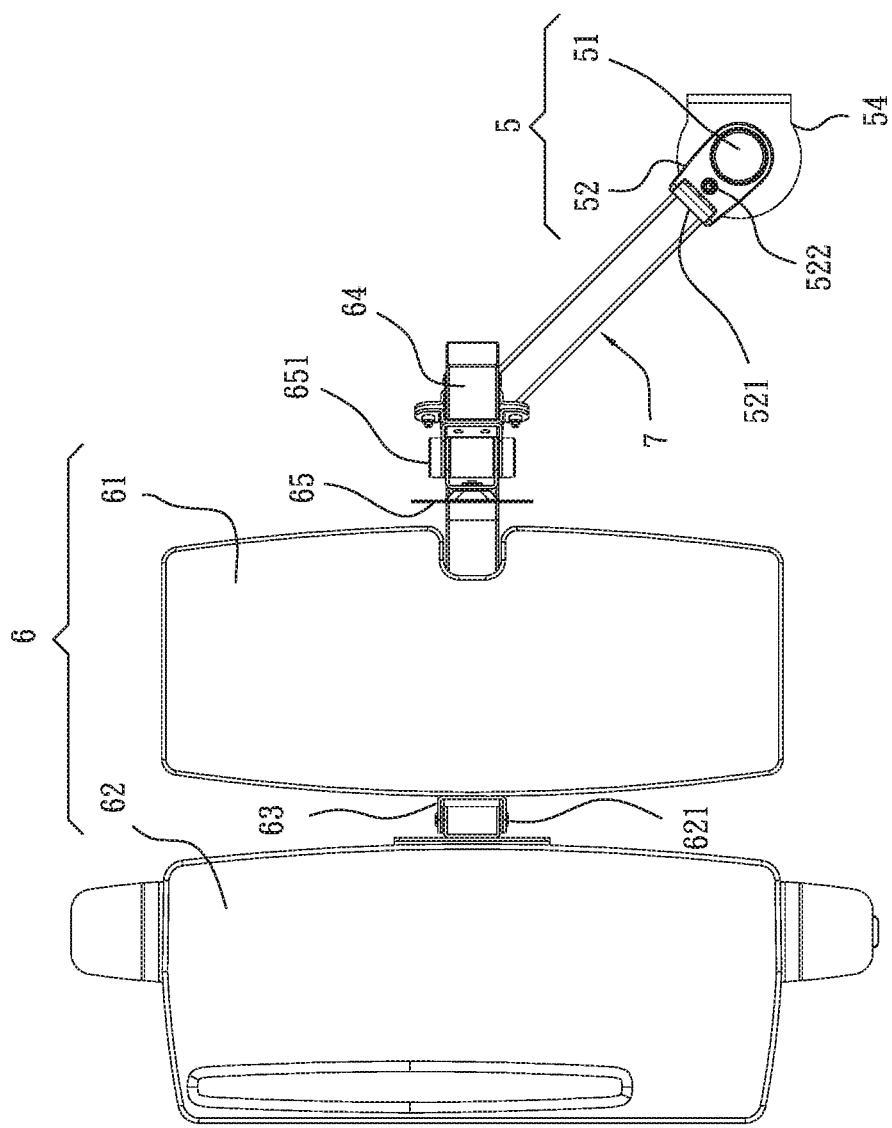
FIG. 24 is another top view of the fourth embodiment of the present invention, showing that it sways to one side.

Referring to FIGS. 21, 22 and 24, according to the fourth embodiment of the present invention, during the positional adjustment, when the paddle 821 is operation, the second loading platform 62 can be pushed or pressed at the same time by a user, so that the loading platform set 6 drives the first and second links 71, 72 to rotate relatively. Throughout the process of the rotation, the imaginary line connecting the pins G and H remains parallel to the imaginary line connecting the pins E and F (holding the parallelogramic area), so the loading platform set 6 is restricted to move forward/backward and upward/downward while remaining parallel to the loading component 5. With the pivotal movement of the first link 71, the damper 81 receives force and is driven to extend or retract.

When the loading platform set 6 moves to a desire position, the user may release the paddle 821, so that the adjustable damper 81 is locked and prevented from extending and retracting, making the loading platform set 6 positioned. Thereby, even if the loading platform set 6 (the first and second loading platforms 61 and 62) receives external force (such as that from a user's palms pressing the second loading platform 62 when operating a keyboard placed on the second loading platform 22), it is unlikely to have unintentional displacement, making its use more convenient.

In practical use, the second loading platform 62 be folded by pivoting it upward on the second pivot 621 (as shown in FIG. 21), and the first loading platform 61 may also be folded by pivoting it upward on the first pivot 611 (not shown), thereby minimizing the space required for storing the collapsed structure.

In the process that the first and second loading platforms 61 and 62 are pushed to move leftward (or rightward), with the pivotable support 64 (i.e. the connector 641) that pivots with respect to the pivotal connector 66, and the revolver 52 that pivots with respect to the guiding post 51, the first and second loading platforms 61 and 62 can remain facing forward (its initial orientation) without deviating with the pivot arm component 7, further improving the convenient use of the present invention.

Figure 25:
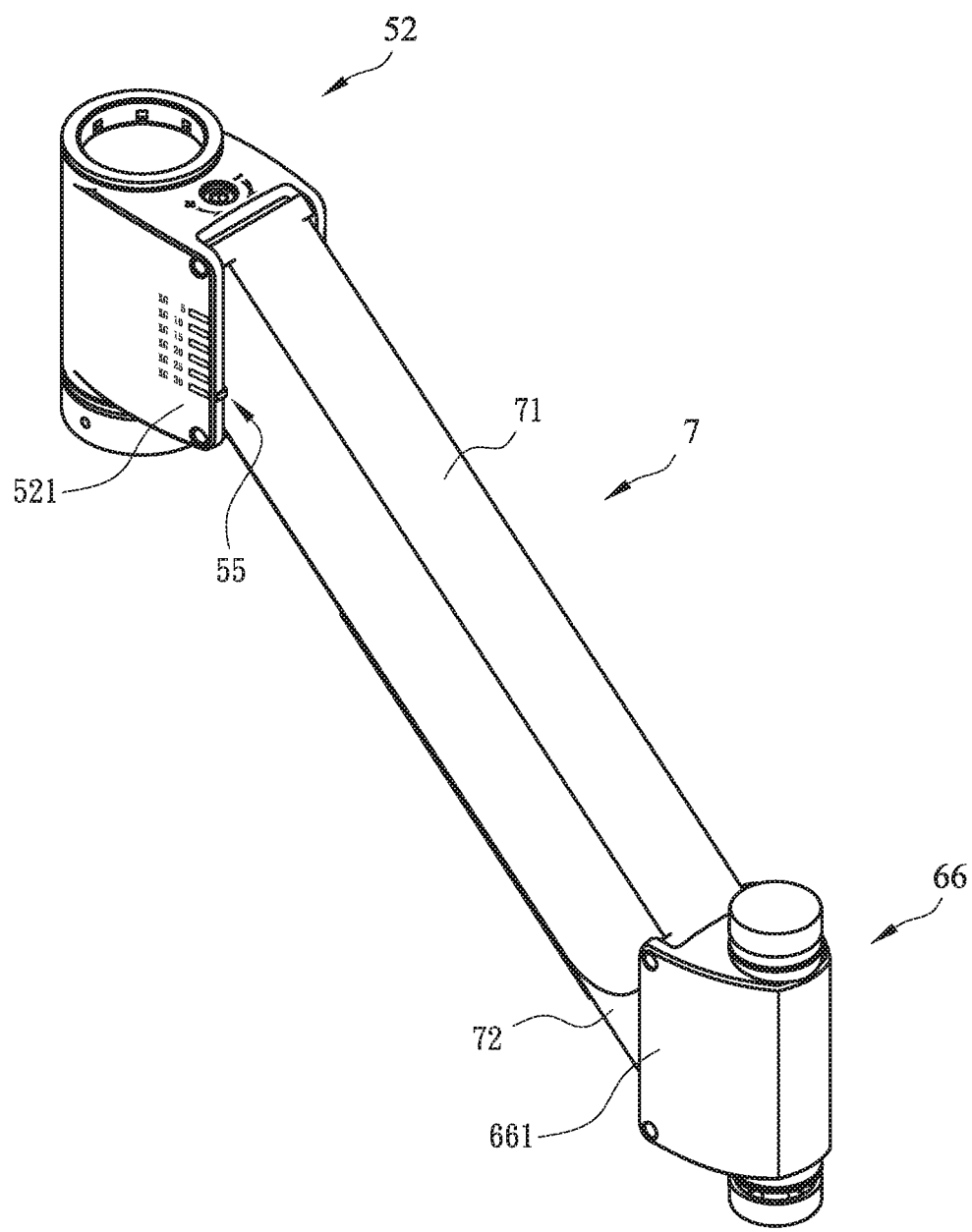
FIG. 25 is a structure schematic view of the lifting mechanism with support function of the fourth embodiment of the present invention.
Figure 26:
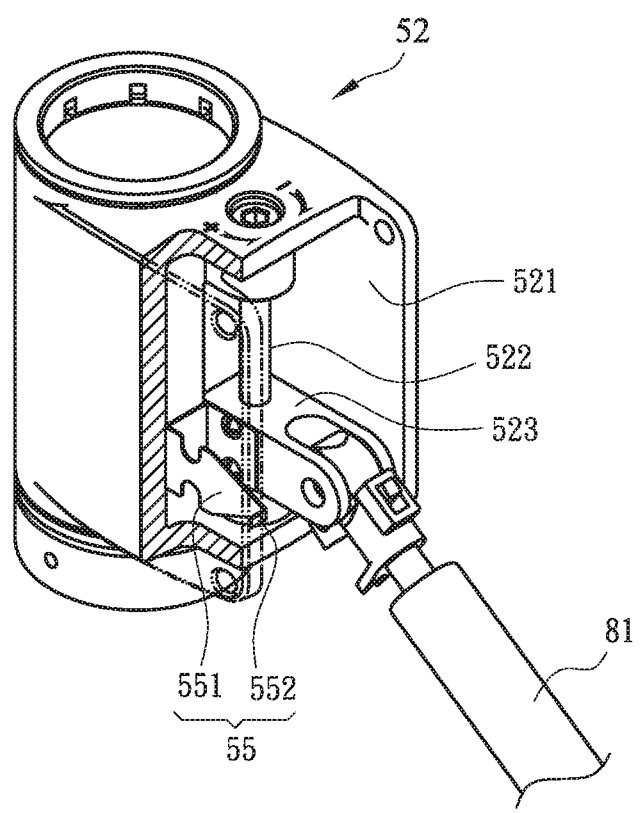
FIG. 26 is a local amplifying perspective view of FIG. 25.

In a feasible embodiment, the inner pivot shaft 522 can be a lead screw, and the combination of which and the first pivot seat 523 can form the adjustment component for adjusting the damping support forse. The inner pivot shaft 522 can revolve to drive the first pivot seat 523 to move upward and downward in order to change the support angle of the adjustable damper 81 connecting to the first pivot seat 523, such that the damping support forse of the adjustable damper 81 provided for the loading platform set 6 can be adjusted to achieve balance with the load, which can decrease the burden of the descending/ascending operation. Furthermore, as shown in FIGS. 25 and 26, an indicator mechanism 55 can be provided to connect to the adjustment component, which includes an indicator 511 connecting to the first pivot seat 523 and can move upward and downward. The indicator 551 has a front end 552 protruding outward, which can show the damping support forse for the user to observe.

To sum up, the mechanism of the present invention can be more convenient, strength-saving and of higher operation stability; besides, the mechanism can freely adjust the damping support forse according to different load requirements, so can significantly increase the convenience in use. The present invention has been described with reference to the preferred embodiments and it is understood that the embodiments are not intended to limit the scope of the present invention. Moreover, as the contents disclosed herein should be readily understood and can be implemented by a person skilled in the art, all equivalent changes or modifications which do not depart from the concept of the present invention should be encompassed by the appended claims.

What is claimed is:

1. A lifting mechanism with support function, comprising:
a fixation joint;
an active joint, connecting to a loading platform set, the active joint including a connection board and a locking sheet, the locking sheet having a first point, a second point and a third point that substantially form a triangle together, the connection board having a first hole, a second hole and a third hole that correspond to the locations of the first point, the second point and the third point;
a pivot arm component, pivotally installed between the fixation joint and the active joint, and including a first pivot arm and a second pivot arm, wherein one end of the first pivot arm is pivotally connected to the fixation joint, the other end of the first pivot arm is pivotally connected to the active joint and connected between the first point and the first hole, one end of the second pivot arm is pivotally connected to the fixation joint, the other end of the second pivot arm is pivotally connected to the active joint and connected between the second point and the second hole, and the third point is connected to the connection board at the third hole;
a relation position of the first pivot arm, the second pivot arm, a pivot shaft of the fixation joint and a pivot shaft of the active joint substantially form a parallelogram, whereby the first pivot arm and the second pivot arm are able to pivot within a certain range, and the active joint descends or ascends relative to the fixation joint; and
a damping positioning mechanism, including an adjustable damper and a switch,
wherein a first end of the adjustable damper is installed on the pivot arm component, and a second end of the adjustable damper connects to one of the fixation joint or the active joint via an adjustment component,
the adjustable damper is connected to the switch via a control cord, and is controlled by the switch to be adjustable in an adjustable status or locked in a locked status,
the adjustable damper is able to extend or retract, and provides a certain damping support force when the adjustable damper is in the adjustable status, such that the active joint is able to pivot relative to the fixation joint via the pivot arm component,
the adjustable damper is able to fix an angle between the pivot arm component, and the active joint or the fixation joint during the locked status for positioning, and
wherein the adjustment component includes a first pivot seat capable of relatively moving, and the second end of the adjustable damper pivotally connects to the first pivot seat, and a support angle of the adjustable damper is able to be changed by adjusting a position of the first pivot seat so as to adjust the damping support force provided from the adjustable damper to support the loading platform set.

2. The lifting mechanism with support function of claim 1, wherein the first end of the adjustable damper is connected to the first pivot arm or the second pivot arm via a second pivot seat.

3. The lifting mechanism with support function of claim 1, wherein the adjustment component further includes a lead screw, and the first pivot seat is mounted on the lead screw, such that the lead screw extends entirely through the first pivot seat; and when the lead screw revolves, the first pivot seat moves along the lead screw.

4. The lifting mechanism with support function of claim 3, wherein the adjustment component further connects to an indicator mechanism for displaying a measurement of the damping support force provided for the loading platform set.

5. The lifting mechanism with support function of claim 4, wherein the indicator mechanism includes a gear set connecting to the lead screw; and the gear set is able to revolve by being linked to the lead screw, and display the measurement of the damping support force provided for the loading platform set via an opening externally exposed to outside.

6. The lifting mechanism with support function of claim 4, wherein the indicator mechanism includes an indicator connecting to the first pivot seat, and the indicator is able to move with the first pivot seat, and display the measurement of the damping support force provided for the loading platform set via a front end protruding outward.

7. The lifting mechanism with support function of claim 1, wherein the first pivot arm and the second pivot arm pivotally connect to an inner position and an outer position respectively via a plurality of shaft sleeves; and the first pivot arm and the second pivot arm have lateral walls capable of overlapping with each other, whereby the lateral walls are able to partially overlap with each other when the first pivot arm and the second pivot arm are in operation.

8. The lifting mechanism with support function of claim 1, wherein the fixation joint is fixed at a base, a clamping base or a revolver.

9. The lifting mechanism with support function of claim 1, wherein the active joint connects to a platform or a pivot holder.

* * * * *